(12) United States Patent
Kataoka et al.

(10) Patent No.: US 9,048,760 B2
(45) Date of Patent: Jun. 2, 2015

(54) DRIVING UNIT OF VIBRATION-TYPE ACTUATOR

(75) Inventors: Kenichi Kataoka, Yokohama (JP); Jun Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 13/050,774

(22) Filed: Mar. 17, 2011

(65) Prior Publication Data

US 2011/0227511 A1 Sep. 22, 2011

(30) Foreign Application Priority Data

Mar. 19, 2010 (JP) .................................. 2010-064317

(51) Int. Cl.
| | | |
|---|---|---|
| *H02N 2/06* | (2006.01) | |
| *H02N 2/14* | (2006.01) | |
| *H02N 2/00* | (2006.01) | |
| *H02N 2/02* | (2006.01) | |
| *H02N 2/16* | (2006.01) | |

(52) U.S. Cl.
CPC ............. *H02N 2/062* (2013.01); *H02N 2/0015* (2013.01); *H02N 2/026* (2013.01); *H02N 2/142* (2013.01); *H02N 2/163* (2013.01)

(58) Field of Classification Search
CPC ......... H02N 2/14; H02N 2/142; H02N 2/145; H02N 2/0075; H02N 2/008; H02N 2/06; H02N 2/062; H02N 2/065
USPC ........................................................ 310/317
See application file for complete search history.

(56) References Cited

U.S. PATENT DOCUMENTS

| | | | |
|---|---|---|---|
| 5,004,964 A | 4/1991 | Kataoka | |
| 5,134,348 A | 7/1992 | Izukawa et al. | |
| 5,905,351 A | 5/1999 | Morishita | |
| 6,100,654 A * | 8/2000 | Izukawa et al. | ............... 318/114 |
| 2007/0046144 A1* | 3/2007 | Urano | ............................ 310/317 |
| 2007/0090779 A1* | 4/2007 | Atsuta et al. | ................... 318/119 |
| 2010/0244627 A1 | 9/2010 | Adachi | |

FOREIGN PATENT DOCUMENTS

| | | |
|---|---|---|
| CN | 1405966 A | 3/2003 |
| CN | 1601879 A | 3/2005 |
| CN | 1698259 A | 11/2005 |
| EP | 0650252 A1 | 4/1995 |
| JP | 61-224885A A | 10/1986 |
| JP | 3022881 A | 1/1991 |
| JP | 6339289 A | 12/1994 |

(Continued)

*Primary Examiner* — Derek Rosenau
(74) *Attorney, Agent, or Firm* — Canon USA, Inc., IP Division

(57) ABSTRACT

A driving unit of a vibration-type actuator includes a command unit, a change making unit, an AC signal generating unit, and a filter unit. The command unit outputs a command signal that directs at least one of a frequency, an amplitude, and a phase difference of an AC signal. The change making unit makes a change to the command signal and outputs the command signal. The AC signal generating unit generates a generated AC signal in which at least one of a frequency, an amplitude, and a phase difference of the generated AC signal is modulated in accordance with the output of the change making unit. The filter unit selectively dampens a frequency component, of at least one of the output signal of the change making unit and an output signal of the AC signal generating unit, that excites vibration other than vibration in a predetermined vibration mode.

37 Claims, 19 Drawing Sheets

(56) References Cited

FOREIGN PATENT DOCUMENTS

| | | |
|---|---|---|
| JP | 3140615 B2 | 3/2001 |
| JP | 3504130 B2 | 3/2004 |
| JP | 2004-260895 A | 9/2004 |
| JP | 2006-339289 A | 12/2006 |
| JP | 2006-353055 A | 12/2006 |
| JP | 2007-124156 A | 5/2007 |
| JP | 2007-159291 A | 6/2007 |
| WO | 2009072301 A1 | 6/2009 |

* cited by examiner

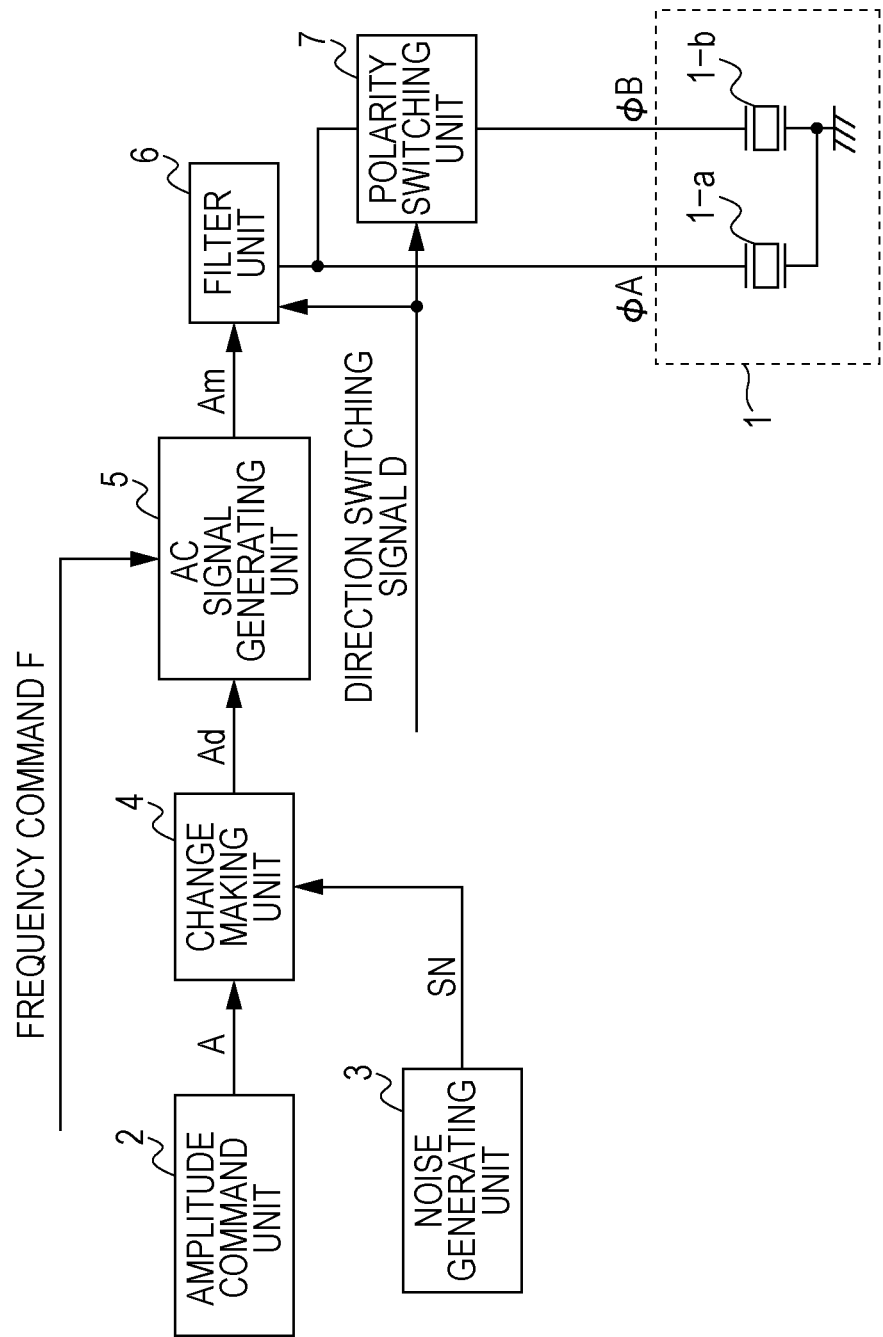

DRIVING
FORCE

DRIVING UNIT OF VIBRATION-TYPE ACTUATOR

BACKGROUND OF THE INVENTION

1. Field of the Invention

The present invention relates to a driving unit of a vibration-type actuator that excites a vibrating body having at least an electro-mechanical energy conversion element by supplying an alternating current (AC) signal (AC voltage) to the electro-mechanical energy conversion element to drive a movable body that is in contact with the vibrating body.

2. Description of the Related Art

The driving speed of vibration-type actuators, such as ultrasonic motors, changes depending on the amplitude of vibration excited on a vibrating body. Therefore, the driving speed is controlled using the amplitude or frequency of an AC signal supplied to an electro-mechanical energy conversion element, such as a piezoelectric element, provided at the vibrating body. It is common to employ a control method using a frequency to reduce fluctuations in resonance frequency due to temperature or the influence of individual differences. In terms of a frequency generating method, there are a digital method using an analog oscillator or quartz oscillator and a programmable frequency divider and a semi-digital method in combination with a digital-to-analog converter.

However, such a digital method has a problem in achieving high frequency resolution.

Japanese Patent Laid-Open No. 06-339289 proposes a method for falsely improving the frequency resolution by periodically changing the frequency dividing rate and using an average frequency dividing rate. Furthermore, it presents a method of increasing the periodic change speed to shift the vibration from an audible range when the periodic change causes vibration in the audible range.

The Publication of Japanese Patent No. 3504130 proposes a method by which an actuator that moves by a predetermined distance every period of a periodic signal using a pulse motor or a piezoelectric element changes its period command little by little and uses the average period. As a method for changing the period command little by little, uniform random numbers are added to the period command of the periodic signal to prevent the period command from periodically changing, thereby preventing generation of a specific audible sound.

However, the methods disclosed in the Publication of Japanese Patent No. 3504130 and Japanese Patent Laid-Open No. 06-339289 change the frequency of AC voltage. Therefore, if frequency components contained in the change are in the vicinity of the natural frequency of the vibrating body or in the vicinity of the natural frequency of a mechanism driven by the actuator, the problems of audible sound or degradation in speed control function may occur. Furthermore, there is also the problem of promoting abrasion due to excitation of unnecessary vibration to degrade the durability.

SUMMARY OF THE INVENTION

The present invention provides a driving unit of a vibration-type actuator. The vibration-type actuator may excite a vibrating body having at least an electro-mechanical energy conversion element in a predetermined vibration mode by applying an alternating current (AC) signal to the electro-mechanical energy conversion element to generate a driving force. The driving unit includes a command unit, a change making unit, an AC signal generating unit, and a filter unit.

The command unit outputs a command signal that directs at least one of a frequency, an amplitude, and a phase difference of the AC signal. The change making unit makes a change to the command signal and outputs the command signal. The AC signal generating unit generates a generated AC signal in which at least one of a frequency, an amplitude, and a phase difference of the generated AC signal is modulated in accordance with the output of the change making unit. The filter unit selectively dampens a frequency component, of at least one of the output signal of the change making unit and an output signal of the AC signal generating unit, that excites vibration other than vibration in the predetermined vibration mode.

Further features of the present invention will become apparent from the following description of exemplary embodiments with reference to the attached drawings.

BRIEF DESCRIPTION OF THE DRAWINGS

FIG. 1 is a block diagram showing a driving unit according to a first embodiment.

DESCRIPTION OF THE EMBODIMENTS

Figure 2A:
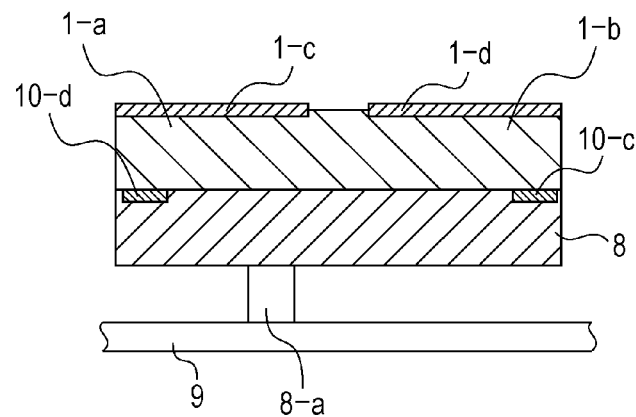
FIG. 2A is a diagram showing a vibration-type actuator according to the first embodiment.

In the driving unit of a vibration-type actuator, by making a change to a command signal that directs at least one of the frequency, amplitude, and phase difference of the AC signal for driving the vibration-type actuator, the frequency, amplitude, or phase difference of the AC signal can be set at a resolution higher than or equal to an effective resolution at which the AC signal generating unit can output an AC signal. Furthermore, unnecessary vibration can be suppressed by selectively damping, of a noise signal generated by the change and ranging over a wide frequency band, a frequency component that excites vibration at a specific natural frequency of the vibration-type actuator and the driving mechanism of the vibration-type actuator using the filter unit. Furthermore, since the nose signal can be dispersed in a wide frequency band by selectively damping the specific frequency component, the level of the noise signal contained in the AC voltage included in AC voltage applied to the vibration-type actuator can be decreased, and thus, generation of audible sound and changes in speed can be reduced.

First Embodiment

FIG. 1 is a block diagram showing a driving unit according to a first embodiment. Reference numeral 1 denotes an electro-mechanical energy conversion element which is a vibrating body. This embodiment includes two electro-mechanical energy conversion elements 1-a and 1-b. Examples of the electro-mechanical energy conversion element 1 include function elements, such as a piezoelectric element, a magnetostrictive element, and an electrostrictive element.

Reference numeral 2 denotes an amplitude command unit that outputs an amplitude command A (command signal) that sets the amplitude of an AC signal (AC voltage) supplied to the electro-mechanical energy conversion element 1. Reference numeral 3 denotes a noise generating unit that generates white noise SN having a predetermined amplitude. Reference numeral 4 denotes a change making unit that adds the output SN of the noise generating unit 3 to the amplitude command A to output an amplitude modulation command Ad. Reference numeral 5 denotes an AC signal generating unit that receives the amplitude modulation command Ad output from the change making unit 4 and a frequency command F from a frequency command unit (not shown) and outputs an amplitude-modulated AC signal. Reference numeral 6 denotes a filter unit having the characteristic of selectively damping a desired frequency component from frequency components contained in the amplitude-modulated AC signal generated from the AC signal generating unit. Reference numeral 7 denotes a polarity switching unit that switches whether to reverse the output signal of the filter unit 6 in accordance with a direction switching signal D from a command unit (not shown). An output signal from the filter unit 6 is supplied to the electrode of the electro-mechanical energy conversion element 1-a, and an output signal or an inverted signal thereof is supplied to the electrode of the electro-mechanical energy conversion element 1-b by the polarity switching unit 7.

Figure 2B:
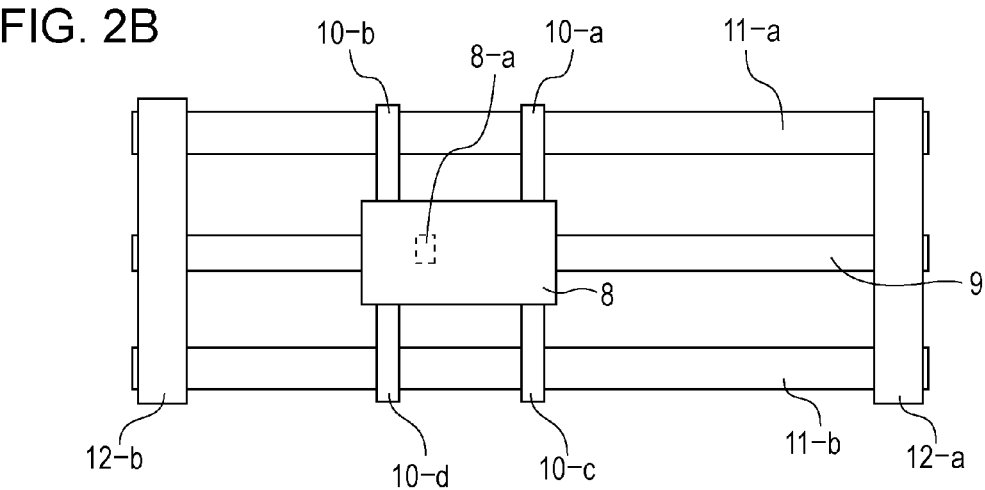
FIG. 2B is a diagram showing the overall configuration of a driving mechanism of the vibration-type actuator according to the first embodiment.
Figure 2C:
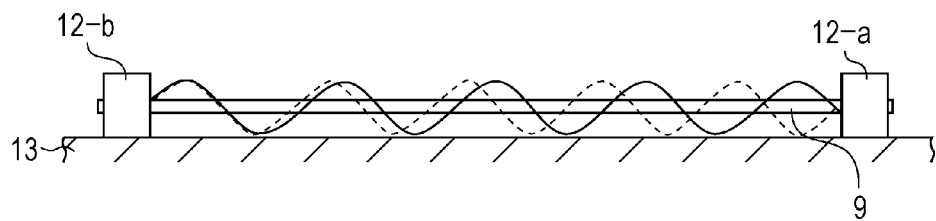
FIG. 2C is a diagram of a slider, as viewed from the side.

FIGS. 2A, 2B, and 2C are configuration diagrams showing a vibration-type actuator and a driving mechanism using the same. FIG. 2A shows a vibration-type actuator, which includes the electro-mechanical energy conversion element 1, an elastic body 8 bonded thereto to configure a vibrating body together, a slicer 9, and a protrusion 8-a of the elastic body 8, which is in pressure contact with the slider 9. In this embodiment, the elastic body 8 is separated from the piezoelectric element; however, if the piezoelectric element has desired elasticity, the elastic body 8 can be omitted. The electro-mechanical energy conversion elements 1-a and 1-b have electrodes 1-c and 1-d for receiving AC signals, respectively. The elastic body 8 is connected to a ground potential.

FIG. 2B shows the overall configuration of the driving mechanism. Reference numerals 10-a, 10-b, 10-c, and 10-d denote supporting members joined to the elastic body 8, for pressing the elastic body 8 against the slider 9 at desired pressure. Reference numerals 11-a and 11-b denote guides that holds the supporting members 10-a, 10-b, 10-c, and 10-d so as to be movable in the horizontal direction. Reference numerals 12-a and 12-b denote fixing members that fix the guides 11-a and 11-b and the slider 9 to a housing 13, to be described later.

FIG. 2C is a diagram of the slider 9, as viewed from the side, in which the solid line and the broken line indicate the vibration shapes of the slider 9 in a natural frequency mode. The fixing members 12-a and 12-b fix the slider 9 to the housing 13.

Figure 3A:
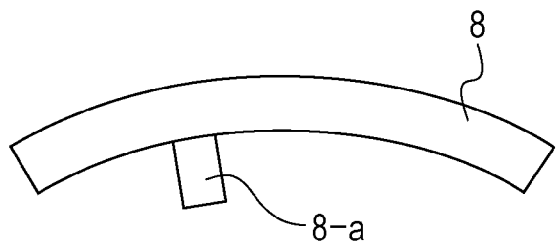
FIG. 3A is a diagram showing a primary bending vibration mode of the elastic body.
Figure 3B:
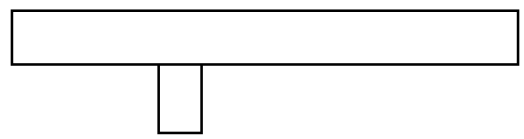
FIG. 3B is a diagram showing the primary bending vibration mode of the elastic body.
Figure 3C:
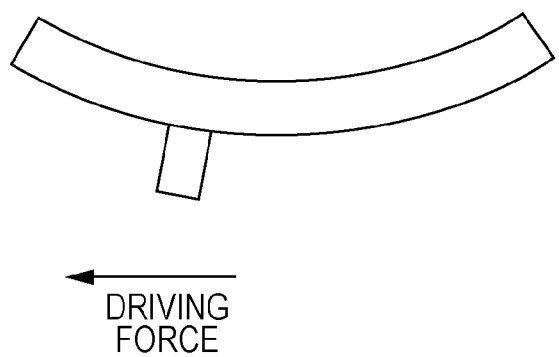
FIG. 3C is a diagram showing the primary bending vibration mode of the elastic body.

Next, the principle of operation of the vibration-type actuator. FIGS. 3A to 3C and FIGS. 4A to 4C show the vibration modes of the elastic body 8, in which the vibration changes with time. FIGS. 3A to 3C show a primary bending vibration mode of the elastic body 8, in which the center of the elastic body 8 bends up and down. When the lower end of the protrusion 8-a is pushed downward and leftward with the bending vibration, a leftward pushing driving force is generated, thus moving the vibration-type actuator to the right in the plane of the drawing.

Figure 4A:
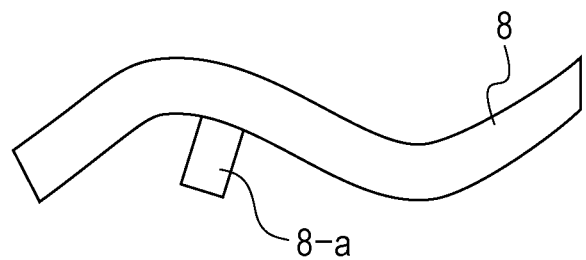
FIG. 4A is a diagram showing a secondary bending vibration mode of the elastic body.
Figure 4B:
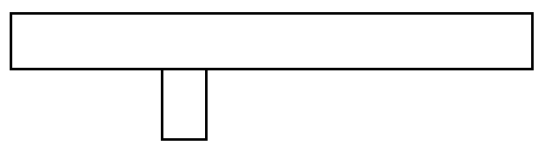
FIG. 4B is a diagram showing the secondary bending vibration mode of the elastic body.
Figure 4C:
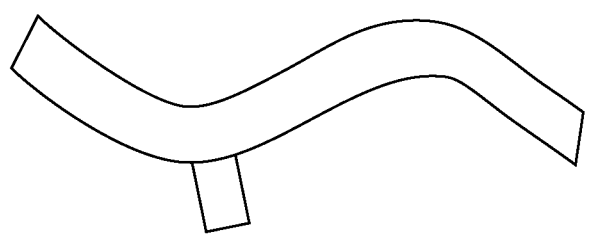
FIG. 4C is a diagram showing the secondary bending vibration mode of the elastic body.

FIGS. 4A to 4C show a secondary bending vibration mode of the elastic body 8, in which the right and left of the elastic body 8 bend in opposite directions. At that time, the lower end of the protrusion 8-a is pushed downward and rightward with the bending vibration to generate a rightward pushing driving force, thus moving the vibration-type actuator to the left in the plane of the drawing. To effectively excite the elastic body 8 in different vibration modes, as shown in FIGS. 3A to 3C and FIGS. 4A to 4C, it is necessary to excite it at frequencies and in excitation patterns suitable for the individual modes. Thus, for a symmetric bending vibration as shown in FIGS. 3A to 3C, the polarity switching by the polarity switching unit 7 is not performed, and AC signals in the same phase are supplied to the electrode 1-c and the electrode 1-d. For a bending vibration in opposite directions left to right, as shown in FIGS. 4A to 4C, the polarity switching by the polarity switching unit 7 is performed, and AC signals in opposite phases are supplied to the electrode 1-c and the electrode 1-d. Furthermore, frequency commands suitable for the individual natural frequency modes are issued from the frequency command unit (not shown) to excite vibrations suitable for the individual modes.

Figure 5A:
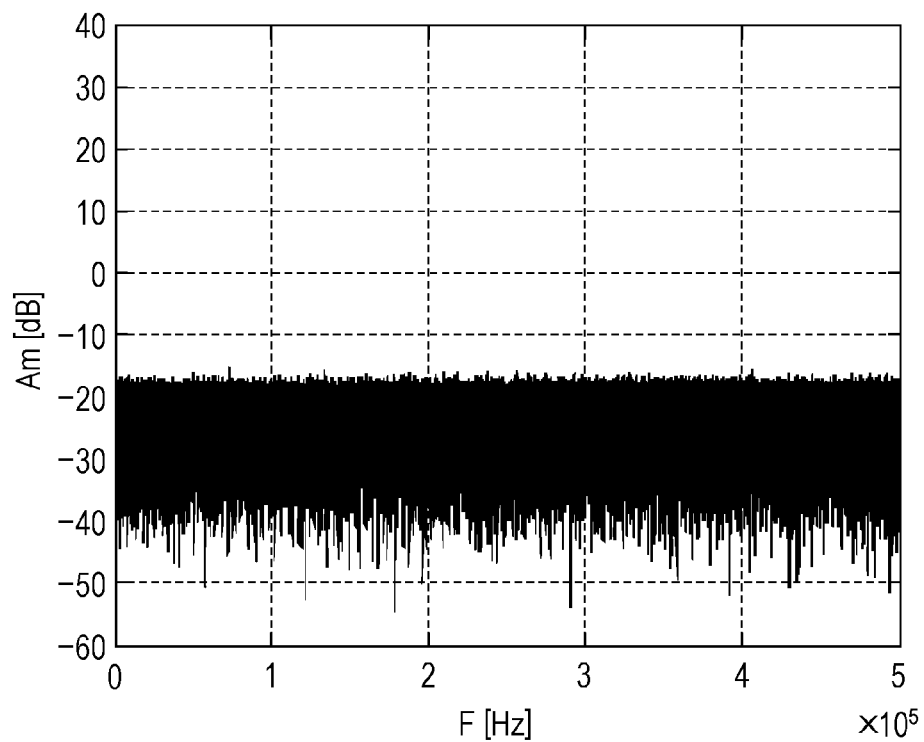
FIG. 5A is a diagram showing the frequency of an output signal of a noise generating unit.
Figure 5B:
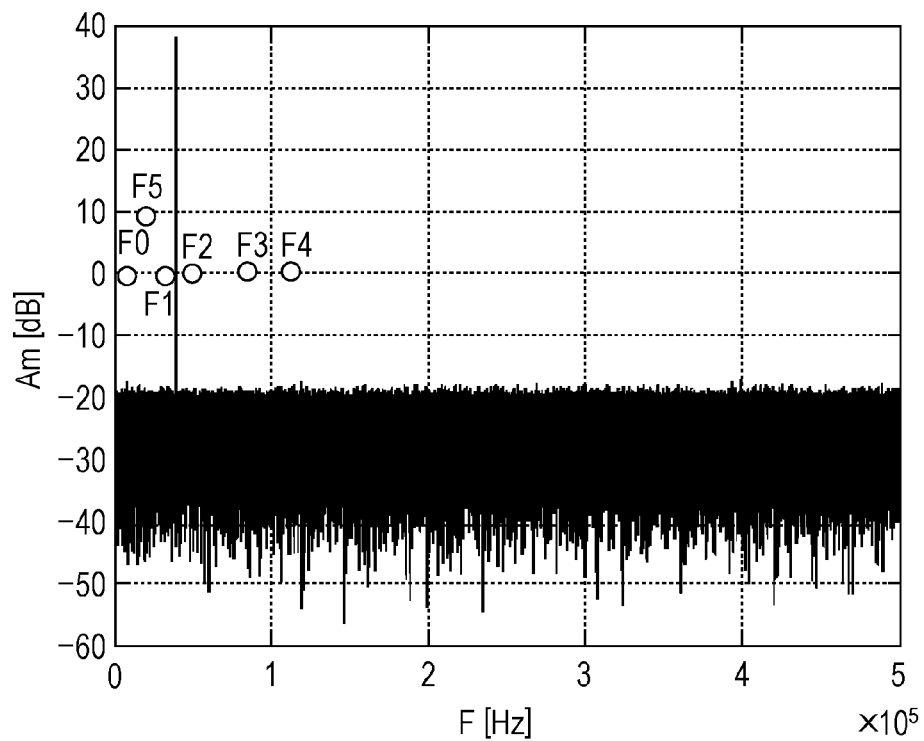
FIG. 5B is a diagram showing the frequency of an amplitude-modulated output signal of an AC signal generating unit 5.

Next, the operations of the individual components in FIG. 1 will be described. FIG. 5A shows the analysis of the frequency of an output signal of the noise generating unit 3, and FIG. 5B shows the analysis of the frequency of an amplitude-modulated output signal of the AC signal generating unit 5. The output signal of the noise generating unit 3 in FIG. 5A has a uniform amplitude characteristic in a wide frequency range. The frequency characteristic of the output signal of the AC signal generating unit 5 in FIG. 5B includes a component having the amplitude A of a frequency directed by a frequency command F from a command unit (not shown) and frequency components which are generated due changes in amplitude and which range over wide upper and lower ranges of frequency F.

The frequencies indicated by white circles F0, F1, F2, F3, F4, and F5 shown in FIG. 5B are the natural frequencies of the individual components of the vibration-type actuator and the driving mechanism shown in FIGS. 2A and 2B. Reference sign F0 denotes a natural frequency in a vibration mode in which the elastic body 8 translates in the bending vibrating direction; F1 denotes the natural frequency of the primary bending vibration of the elastic body 8; F2 denotes the natural frequency of the secondary bending vibration of the elastic body 8; F3 denotes the natural frequency of the ninth bending vibration of the slider 9; F4 denotes the natural frequency of the tenth bending vibration of the slider 9; and F5 denotes the natural frequency of a component (not shown) fixed to the housing 13. FIG. 2C shows the state of the ninth binding vibration of the slider 9 in a solid line, and the tenth bending vibration of the slider 9 in a broken line.

Here, suppose that the frequency components of the output signal of the AC signal generating unit 5 include the same frequency as the natural frequencies F0 to F5. The elastic body 8 is vibrated at the natural frequencies F0 to F5, and the elastic body 8 vibrates in its corresponding vibration mode at the frequencies F0 to F2 because it is the vibration mode of the elastic body 8. Since the frequencies F3 to F5 are not of the vibration mode of the elastic body 8, no large vibration occurs in the elastic body 8.

Although component (not shown) fixed to the slider 9 and the housing 13 vibrate when the vibration of the elastic body 8 is transmitted thereto, no large vibration occurs at F0 to F2 because their natural frequencies are greatly different. However, at F3 to F5, large vibration can occur if the Q factor of the vibrations at components (not shown) fixed to the slider 9 and the housing 13 is high. In other words, in the case where the output signal of the AC signal generating unit 5 includes a signal having a large number of frequency components, vibrations other than a vibration in a predetermined vibration mode of the elastic body 8 (a main vibration mode conductive to generation of a driving force, which corresponds to the vibration modes shown in FIGS. 3A to 3C and FIGS. 4A to 4C in this embodiment) can also occur.

The driving unit of a vibration-type actuator can suppress excitation of vibrations other than the vibration of the elastic body 8 in a predetermined vibration mode.

The driving unit of a vibration-type actuator can substantially achieve resolutions higher than the settable resolutions of the parameters of AC voltage that can be set digitally (for example, frequency, amplitude, and phase difference) when controlling the vibration amplitude, moving speed and so on of the vibrator of a vibration-type actuator using the parameters as control input.

The configuration therefor will be described below.

The AC signal generating unit 5 can digitally set the amplitude of its output signal, in other words, can set the amplitude with a predetermined effective resolution. The amplitude here is a value corresponding to the amplitude of the main frequency of an AC signal output from the AC signal generating unit 5; for example, for a sine-wave signal, for example, a value corresponding to the difference between the maximum value and the minimum value, and for a pulse signal having a constant amplitude, the pulse width thereof corresponds to the amplitude. The main frequency is a frequency close to the natural frequency of the primary bending vibration or the secondary bending vibration of the elastic body 8. This frequency is input from the frequency command unit (not shown) to the AC signal generating unit 5 as a frequency command.

Suppose that the elastic body 8 is to be moved along the slider 9 at a desired speed. The moving speed of the elastic body 8 changes depending on the magnitude of the vibration amplitude of the elastic body 8. Accordingly, the vibration amplitude of the elastic body 8 can be changed by changing the frequency or amplitude of an AC signal supplied to the electro-mechanical energy conversion element 1. In this embodiment, since the vibration frequency is fixed by a frequency command from the command unit (not shown), the moving speed of the elastic body 8 is controlled by the amplitude of the AC signal.

Figure 6A:
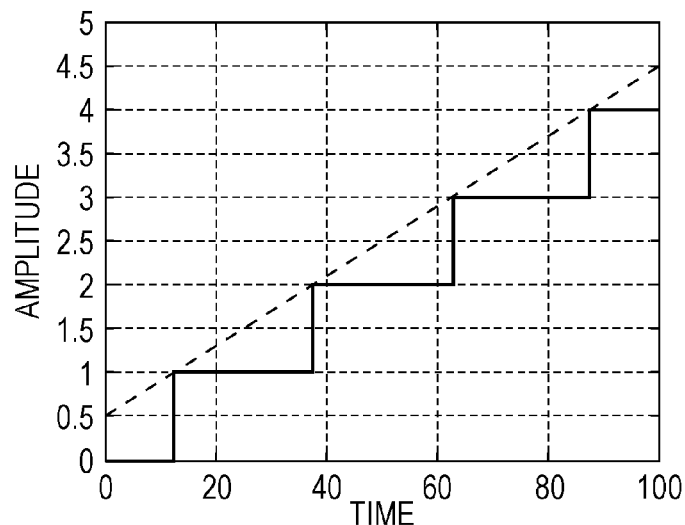
FIG. 6A is a diagram showing an amplitude modulation command and the amplitude of an AC signal output from an AC signal generating unit.
Figure 6B:
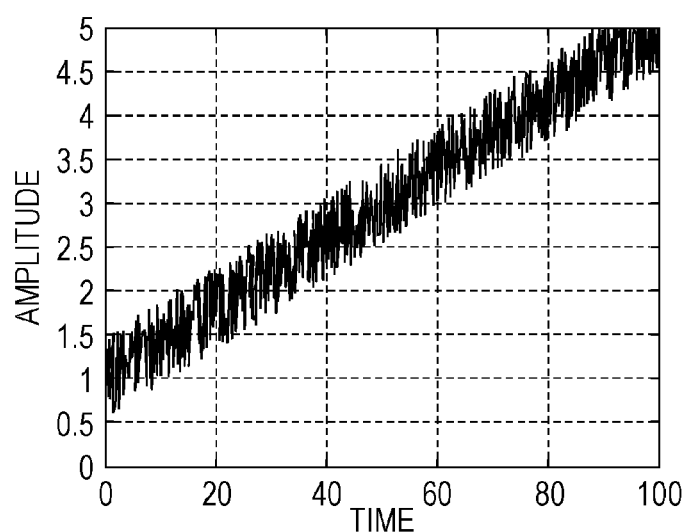
FIG. 6B is a diagram showing a state in which the noise signal is superimposed on the amplitude modulation command.
Figure 6C:
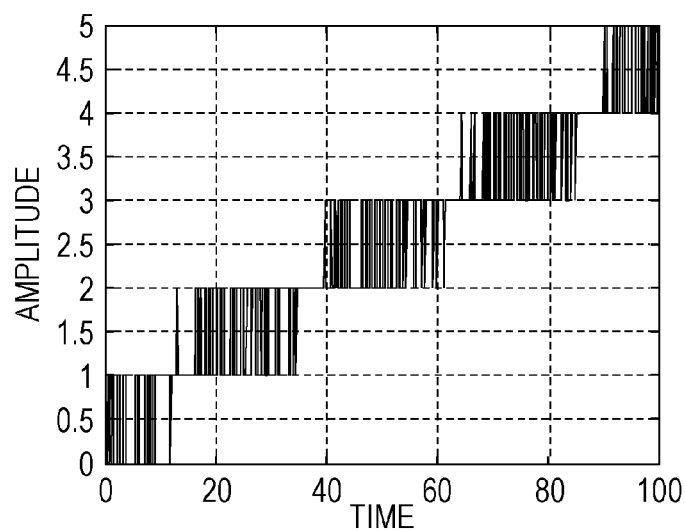
FIG. 6C is a diagram showing the amplitude of an AC signal that the AC signal generating unit outputs in accordance with the amplitude modulation command.

Here, the output amplitude of the AC signal generating unit 5 can be set only at a predetermined effective resolution, that is, discretely. In this case, the resolution of the moving speed of the elastic body 8 is determined by the effective resolution of the output amplitude of the AC signal generating unit 5. Thus, in this embodiment, the amplitude modulation command Ad in which white noise having an amplitude with a resolution higher than or equal to the effective resolution of the output amplitude of the AC signal generating unit 5 is added to the amplitude command A is generated by the change making unit 4. This amplitude modulation command Ad is input to the AC signal generating unit 5 so as to cope with an amplitude command in an intermediate level of the effective resolution. That is, this intermediate amplitude command is omitted at or below the minimum resolution of the output amplitude of the AC signal generating unit 5 and is not reflected to the output signal of the AC signal generating unit 5. Thus, by adding white noise to this intermediate amplitude command, the output amplitude of the AC signal generating unit 5 is fluctuated in terms of probability to generate an output amplitude at an intermediate level of the effective resolution using an average output amplitude. FIGS. 6A to 6C are diagrams for describing this operation. In FIG. 6A, the graph indicated by the ramp-like broken line indicates an amplitude modulation command Af, and the stepped solid line indicates the amplitude of an AC signal output from the AC signal generating unit 5. FIG. 6B shows a state in which the noise signal SN is superimposed on the amplitude modulation command Af. FIG. 6C shows the amplitude of an AC signal that the AC signal generating unit 5 outputs in accordance with the amplitude modulation command Af in FIG. 6B. Thus, the output amplitude of the AC signal generating unit 5 changes at a predetermined width to increase the time average resolution, thus improving the resolution of the moving speed of the elastic body 8.

The frequency components of the AC signal of which the amplitude changes with time include a wide range of frequency components, as shown in FIG. 5B. This poses the problem of exciting vibration other than vibration in a predetermined vibration mode of the elastic body 8. Thus, this embodiment is configured to selectively damp a frequency component that excites vibration other than the vibration of the elastic body 8 in a predetermined vibration mode using the filter unit 6 for the amplitude-modulated AC signal from the AC signal generating unit 5.

Figure 7A:
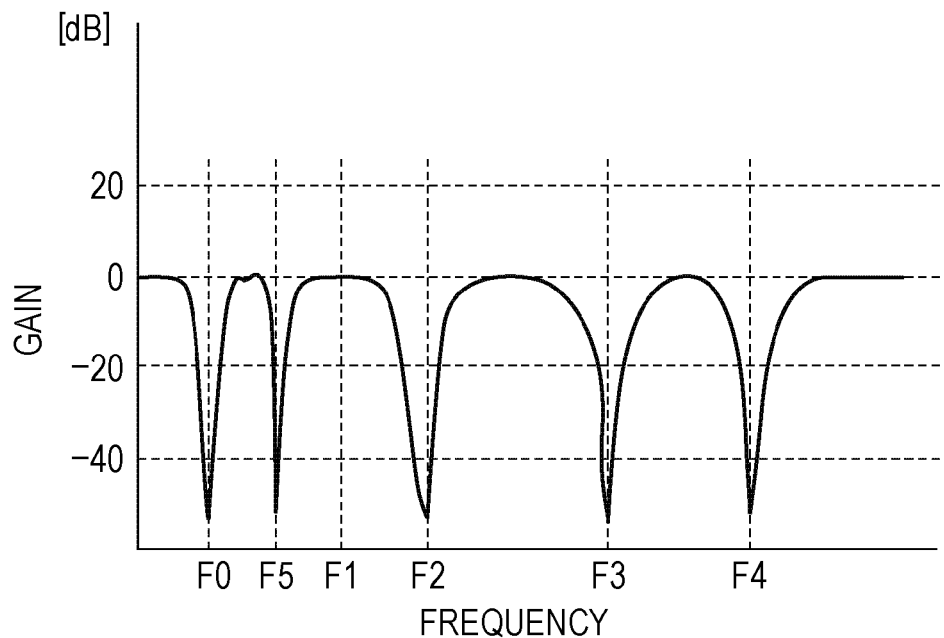
FIG. 7A is a diagram showing a frequency characteristic.
Figure 7B:
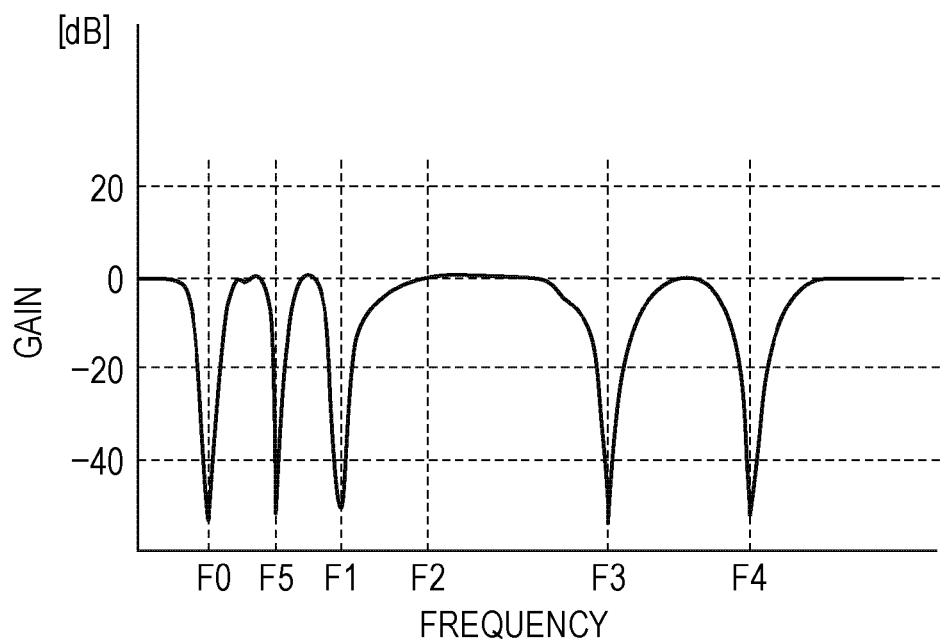
FIG. 7B is a diagram showing a frequency characteristic.

FIGS. 7A and 7B are diagrams showing the relationship between the frequency characteristic of the filter unit 6 and the frequencies F0 to F5 shown in FIG. 5B. In this embodiment, the moving direction is switched by switching between the frequency F1 and the frequency F2, and thus, when the elastic body 8 is driven at one frequency, the other vibration needs to be suppressed. Thus, the filter unit 6 is configured to switch between the two frequency characteristics by the direction switching signal D.

FIG. 7A shows a frequency characteristic when the elastic body 8 is driven at frequency F1, and FIG. 7B shows a frequency characteristic when the elastic body 8 is driven at frequency F2. When the elastic body 8 is driven at frequency F1, the filter unit 6 functions as a filter that selectively damps the signal at frequencies F0, F2, F3, F4, and F5, as shown in FIG. 7A. When the elastic body 8 is driven at frequency F2, the filter unit 6 functions as a filter that selectively damps the signal at frequencies F0, F1, F3, F4, and F5, as shown in FIG. 7B. The frequency components selected for damping preferably have a band within ±1 kHz around the frequencies to be damped in consideration of fluctuations in natural frequency due to environments. In this embodiment, the elastic body 8 has the out-of-plane plane primary and secondary bending vibration modes; it is needless to say that it may have higher-order vibration modes, a stretching vibration mode, or an in-plane vibration mode. Furthermore, although this embodiment shows an example of a standing-wave vibration-type actuator that uses a rectangular elastic body, vibration-type actuators that use a ring-shaped vibrator using a traveling vibration wave and a rod-like elastic body using whirl vibration, torsional vibration, or stretching vibration may be applied. Although FIGS. 7A and 7B show examples in which the frequency characteristic of the filter unit 6 substantially agrees with the natural frequency, they do not necessarily need to agree with each other because the natural frequency fluctuates depending on its environment. In other word, the frequency characteristic of the filter unit 6 may be different from the natural frequency to allow for some fluctuations.

Figure 8A:
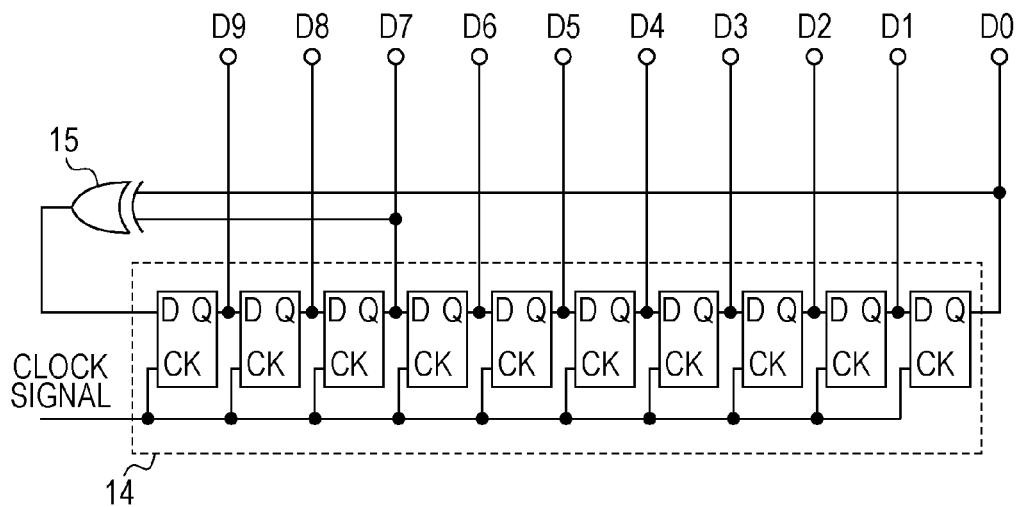
FIG. 8A is a diagram showing the circuit configuration of the noise generating unit.
Figure 8B:
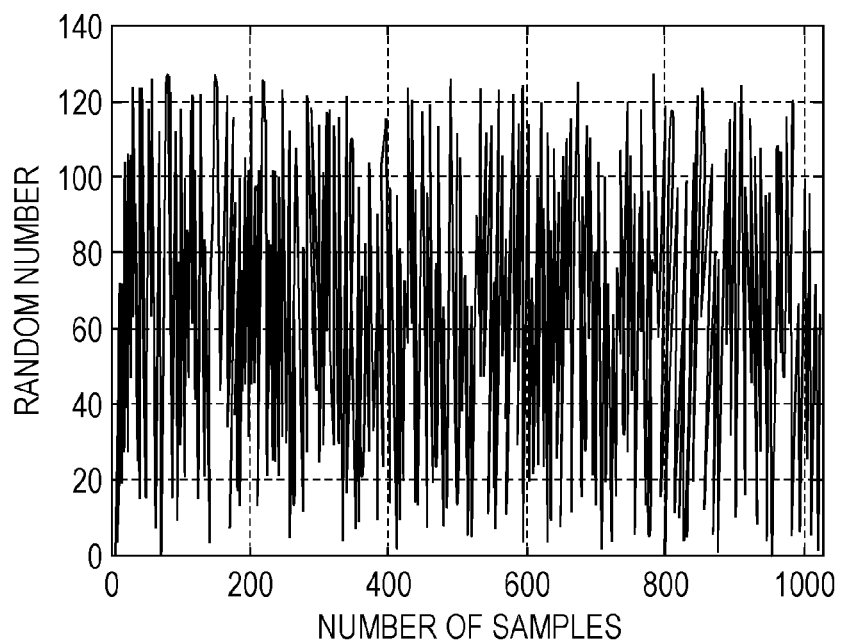
FIG. 8B is a diagram showing an example of the output signal of the noise generating unit.

FIGS. 8A and 8B show a concrete configuration example of the noise generating unit 3. FIG. 8A shows a circuit configuration, and FIG. 8B shows an example of the output signal SN. Reference numeral 14 denotes a shift register in which ten D-flip-flops are connected in series and which inputs the seventh bit D7 and the zeroth bit D0 to an exclusive OR element 15. The output of the exclusive OR element 15 is returned to the data input of the shift register 14. The initial value of the shift register 14 can be set to any value other than 0. The output signals D0 to D9 of the shift register 14 can generate high-quality random numbers in which the frequencies of occurrence of 0 and 1 are substantially the same and having little correlation to one another in synchronization with a clock signal input from the outside. Thus, if any bit signal is selected in any order from the output signals D0 to D9 of the shift register 14 and is extracted as, for example, 7-bit data, a high-quality 7-bit output signal SN can be generated. This noise generating method employs a method for generating random numbers which is generally called M-sequence.

FIG. 8B shows an example in which 7-bit random numbers are output in synchronization with a 1,023-pulse clock signal. Since the 10-bit shift register 14 is used, the same pseudo-random numbers can be repeatedly generated 1,023 times that is obtained by subtracting 1 from the maximum value 1,024 of 10-bit binary numbers. Increasing the number of bits of the shift register can generate long-period random numbers, thus allowing a substantially random number sequence to be generated.

Figure 9A:
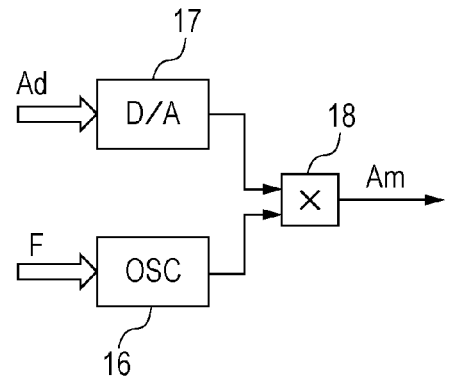
FIG. 9A is a diagram showing a configuration example of the AC signal generating unit.
Figure 9B:
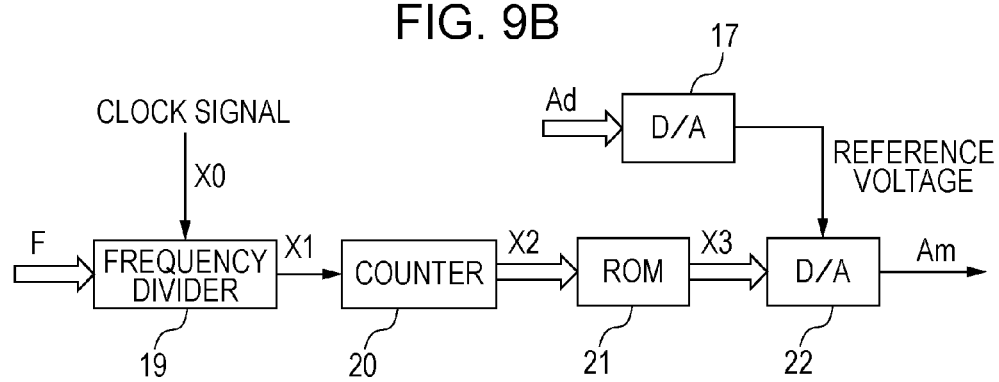
FIG. 9B is a diagram showing a configuration example of the AC signal generating unit.
Figure 9C:
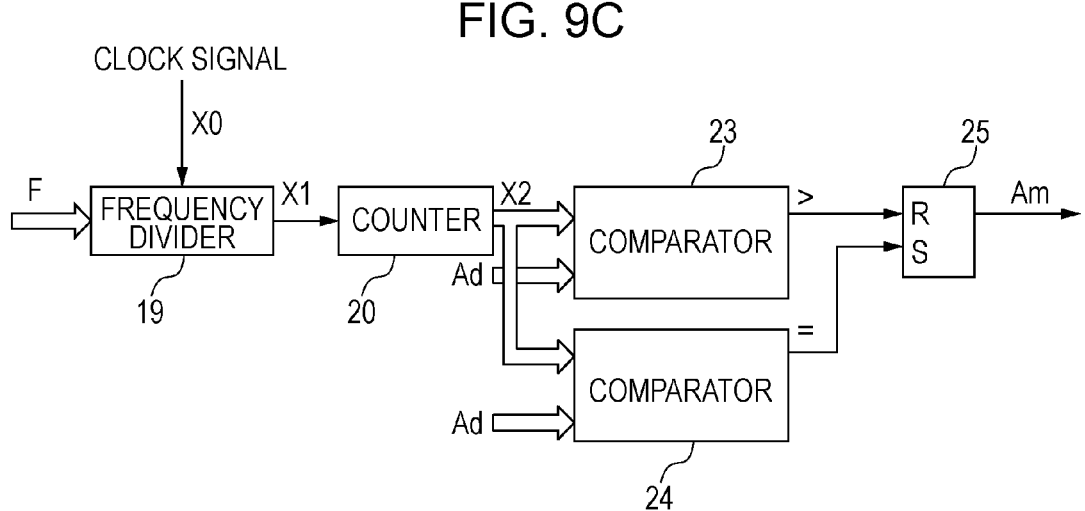
FIG. 9C is a diagram showing a configuration example of the AC signal generating unit.

Next, the concrete configuration and operation of the AC signal generating unit 5 will be described. When the amplitude command A and the output signal SN are added by the change making unit 4 and are input to the AC signal generating unit 5, an AC signal whose amplitude is modulated by the output signal SN can be obtained. FIGS. 9A to 9C are circuit diagram showing concrete examples of the AC signal generating unit 5. FIG. 9A shows a configuration in which the amplitude is changed using a sine-wave oscillator and a multiplier. Reference numeral 16 denotes a sine-wave oscillator capable of setting the frequency in accordance with the frequency command F from the frequency command unit (not shown). Reference numeral 17 denotes a digital-to-analog converter that converts the amplitude modulation command Ad, which is a digital signal, to analog voltage. Reference signal 18 denotes a multiplier that multiply the output signals of the digital-to-analog converter 17 and the sine-wave oscillator 16 together. The output signal Am of the multiplier 18 is a signal in which the amplitude of the output signal of the sine-wave oscillator 16 is modulated by the amplitude modulation command Ad.

FIG. 9B shows an example in which a sine wave is generated by a digital method instead of the sine-wave oscillator 16 in FIG. 9A. Reference numeral 19 denotes a known frequency divider. The frequency divider 19 sets a frequency dividing rate (N) corresponding to the frequency command F from the frequency command unit (not shown) and outputs a pulse signal X1 with a frequency (Fx0/N) that is an integral sub-multiple of the frequency (Fx0) of the output signal X0 of a quartz oscillator (not shown). Reference numeral 20 denotes a counter, which counts the number of pulse signals of the pulse signal X1 and outputs a count signal X2. The counter 20 is reset to 0 when the count signal X2 reaches a predetermined value. Reference numeral 21 denotes a known ROM, which receives the count signal X2 as an input and in which a sine-wave pattern corresponding to the phase of the count signal X2 is stored. The count signal X2 is a saw-tooth digital signal that increases at regular intervals in synchronization with the pulse sequence of the pulse signal X1. The ROM 21 receives the digital signal as an address input and outputs a sine-wave digital signal X3 at a constant rate. Reference numeral 22 denotes a digital-to-analog converter, which receives the sine-wave digital signal X3 output from the ROM 21 and outputs an analog sine-wave signal Am.

On the other hand, the amplitude modulation command Ad is converted to analog voltage by the digital-to-analog converter 17 and is input to the reference voltage input of the digital-to-analog converter 22. Thus, the digital-to-analog converter 22 is configured to change the output amplitude of the sine-wave signal Am.

FIG. 9C shows an example of a configuration in which the amplitude of the fundamental wave of a pulse signal by changing the pulse width of the pulse signal instead of outputting an analog sine-wave waveform. Since the operations of the frequency divider 19 and the counter 20 are the same as those in FIG. 9B, descriptions thereof will be omitted. Reference numerals 23 and 24 denote comparators. The comparator 23 compares the count signal X2 and the amplitude modulation command Ad, and when the count signal X2 becomes larger than the amplitude modulation command Ad, it outputs 1. The comparator 24 outputs 1 when the count signal X2 exceeds the predetermined value and is reset to 0. Reference numeral 25 denotes a known RS flip-flop, which outputs a pulse signal Am whose output becomes 1 when the count signal X2 becomes 0, and becomes 0 when the count signal X2 becomes larger than the amplitude modulation command Ad. Thus, the pulse signal Am in which the pulse width is changed depending on the amplitude modulation command Ad is generated.

In this embodiment, the change making unit 4 makes a change by adding white noise; alternatively, a method of using multiplication and division, a method using functions, a method of using a ROM table, or another method may be employed. For example, if the amplitude command A is multiplied by a signal in which 1 is added to white noise in the range of ±0.01 (1±0.01), a change within A±0.01×A can be given. A periodically repeated change may be given instead of the white noise. This can offer the same effect of suppressing unnecessary vibration as by the filter unit 6, although the effect of making a change differs. To cause a periodic change, there are a method of using a sine-wave oscillator and a method of using a saw-tooth wave generator instead of the noise generating unit 3. In that case, the frequency of the periodic change can be set, in advance, to frequencies other than the natural frequency of vibrations in a predetermined vibration mode and not in the predetermined vibration mode.

Figure 10:
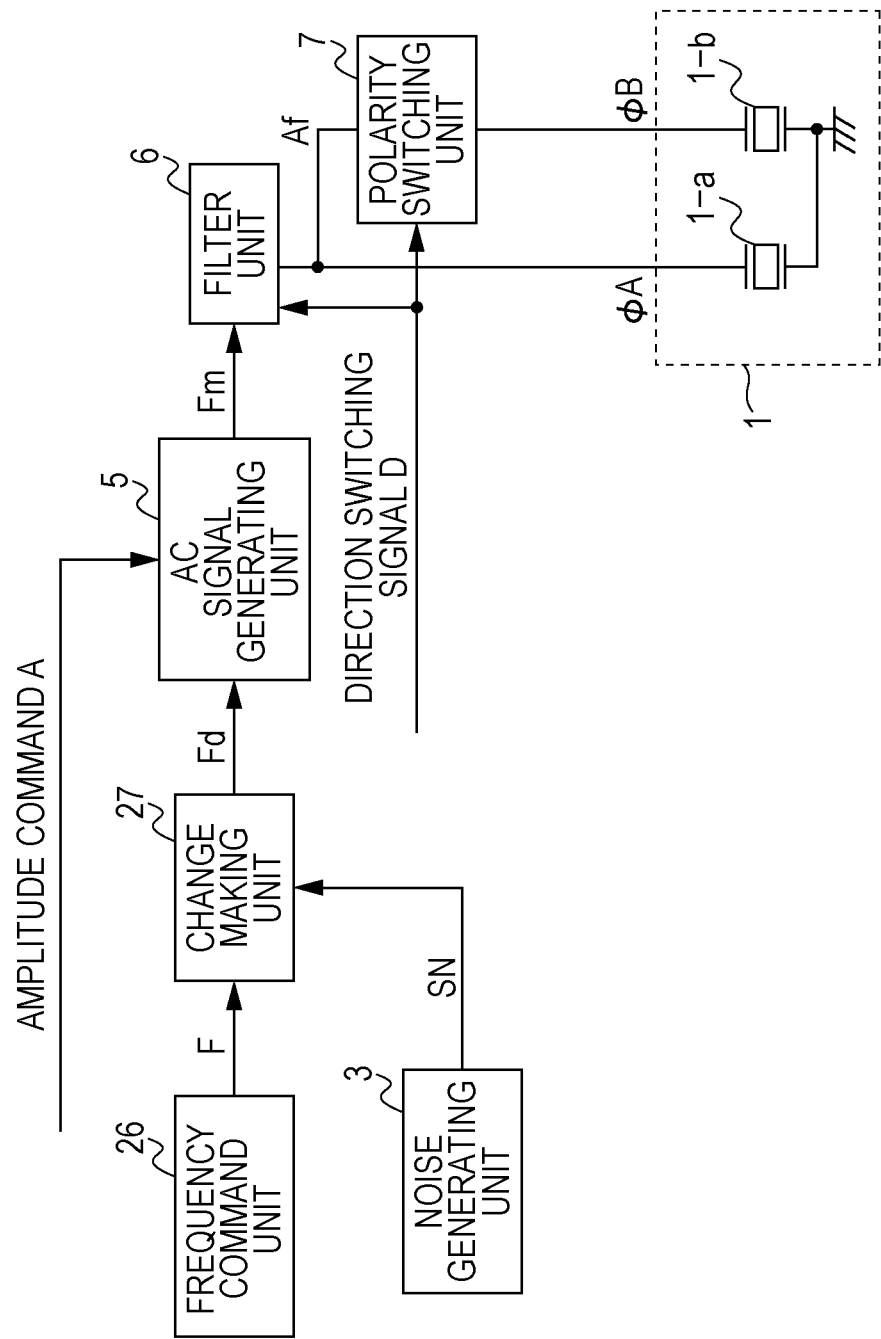
FIG. 10 is a diagram showing a second configuration of the first embodiment.

Although the above embodiment shows an example in which the amplitude is modulated, the frequency may be modulated. FIG. 10 shows a configuration in which the blocks related to amplitude and frequency are replaced. Reference numeral 26 denotes a frequency command unit that outputs a frequency command F that sets the frequency of an AC signal supplied to the electro-mechanical energy conversion element 1. Reference numeral 27 denotes a change making unit that adds the output signal SN of the noise generating unit 3 to the frequency command F and outputs a frequency modulation command Fd. The AC signal generating unit 5 receives an amplitude command A (not shown) and the frequency modulation command Fd output from the change making unit 27 and outputs an frequency-modulated AC signal Fm with a desired amplitude. Since the other configurations are the same as those in FIG. 1, descriptions thereof will be omitted.

The vibration amplitude of the vibrator of the vibration-type actuator changes with changes in the amplitude of an AC signal supplied to the electro-mechanical energy conversion element 1 and also with changes in the frequency of voltage applied. Since the moving speed changes with changes in the amplitude of the vibrator, the moving speed can be controlled also by a method of controlling the frequency of applied voltage, as in the above example. There is little difference in the distribution of the amplitudes of frequency components contained in the output signal of the AC signal generating unit 5 between the case where the amplitude is modulated and the case where the frequency is modulated, provided that the changes made are small. Accordingly, the effect of the filter unit 6 with the configuration in FIG. 10 is the same as that in FIG. 1. Both the amplitude and frequency may be modulated to increase the resolutions. To control the frequency and amplitude individually for independent purposes, it is necessary that noise signals for setting a frequency and for setting an amplitude for use in making a change have low correlation. However, to use them for the same control purpose, noise signals closely correlated with each other may be used with care to have the same polarity for the purpose.

The AC signal generating unit 5 in FIG. 10 can be configured by replacing the frequency command F with the amplitude command A, the amplitude modulation command Ad with the frequency modulation command Fd, and the output signal Am with the output signal Fm in the configuration shown in FIG. 9. Since the operations are the same, a description thereof will be omitted.

Figure 11A:
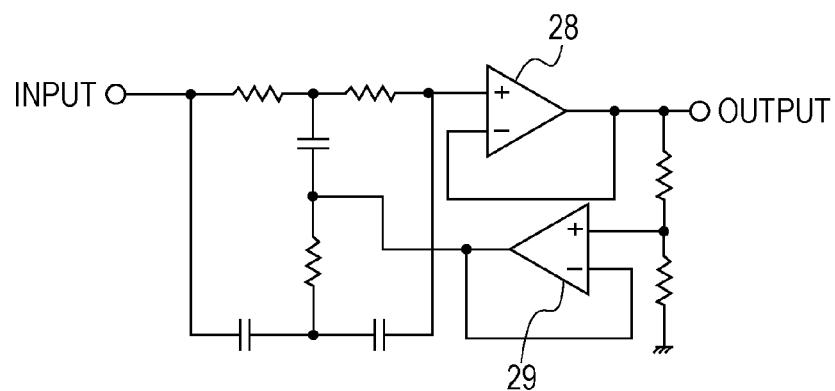
FIG. 11A is a diagram showing a circuit example of the filter unit.
Figure 11B:
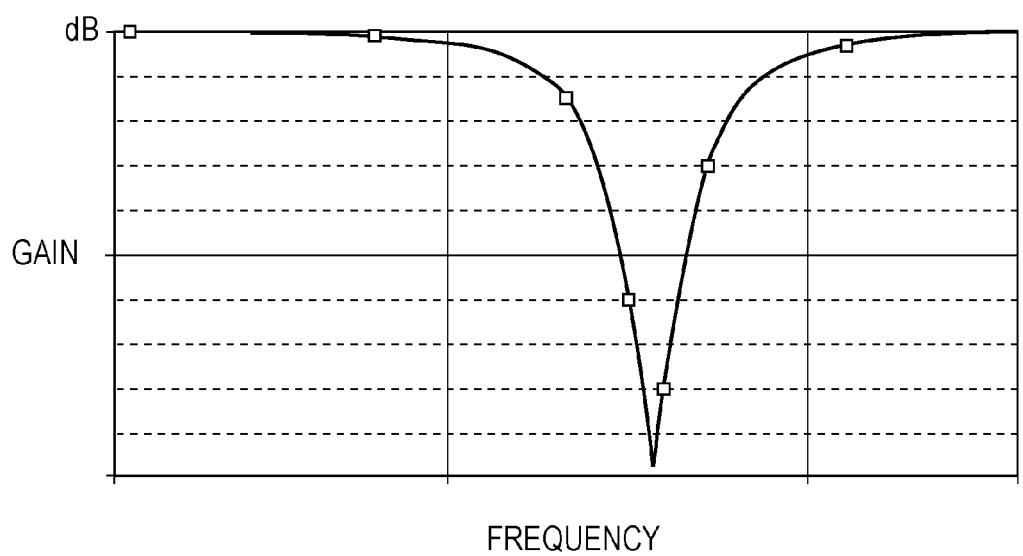
FIG. 11B is a diagram showing the frequency characteristic of the circuit.

FIG. 11A shows a circuit example of the filter unit 6. This circuit is configured by operational amplifiers 28 and 29, resistors, and capacitors and has the filter function of damping an input signal with a specified frequency. By connecting a plurality of the circuits in series, the frequency components of a plurality of natural frequencies can be damped. FIG. 11B shows the frequency characteristic of the above circuit.

Since the circuit in FIG. 11A has a damping characteristic for one frequency, connecting a plurality of circuits in series and in multilevels is required for a plurality of natural frequencies.

Figure 12A:
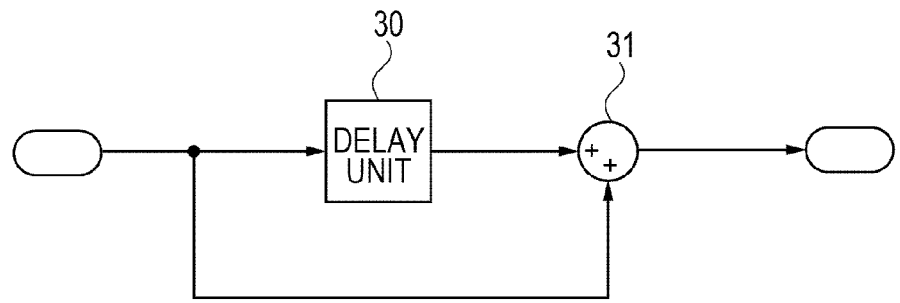
FIG. 12A is a diagram showing a configuration example of a comb filter.
Figure 12B:
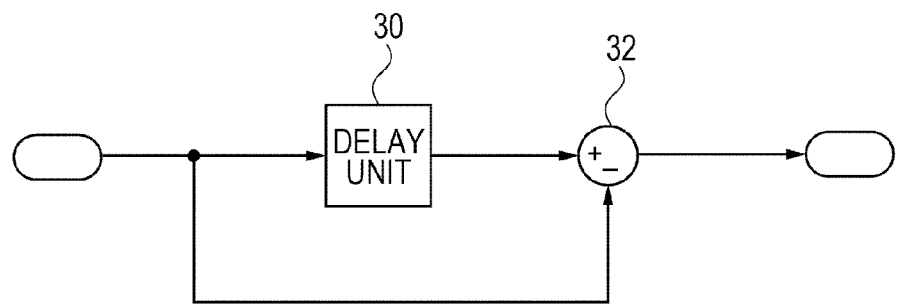
FIG. 12B is a diagram showing a configuration example of a comb filter.
Figure 13A:
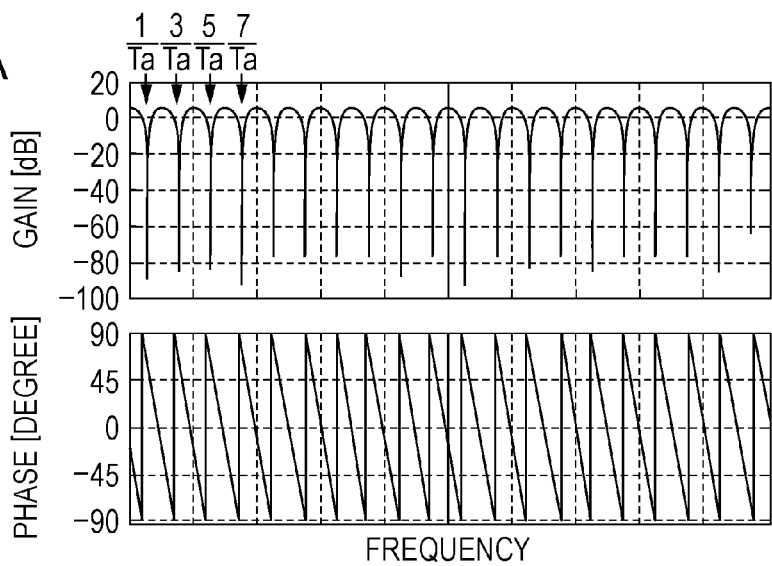
FIG. 13A is a diagram showing the frequency characteristic of the comb filter in FIG. 12A.
Figure 13B:
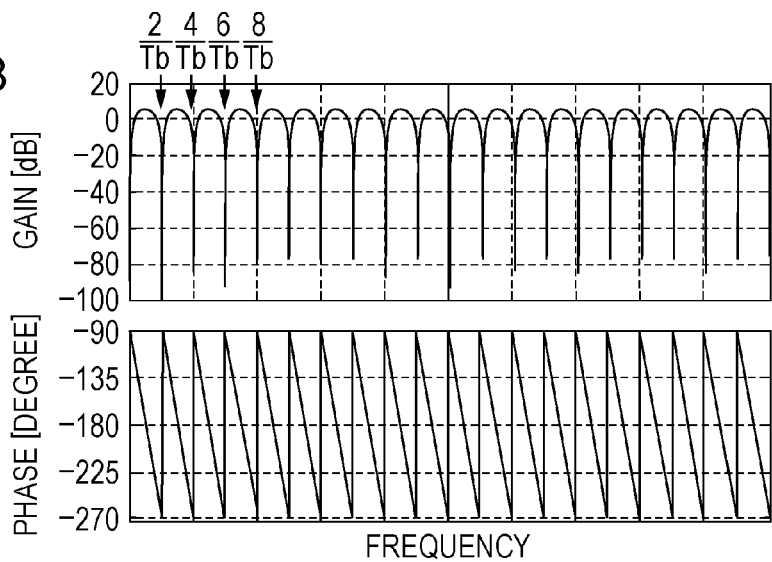
FIG. 13B is a diagram showing the frequency characteristic of the comb filter in FIG. 12B.

Circuit examples using a comb filter having a damping characteristic for a plurality of frequencies with one circuit will be shown as a method therefor. FIGS. 12A and 12B show two circuit examples, and FIGS. 13A and 13B show the respective frequency characteristics. Reference numeral 30 denotes a delay unit that delays an input signal by a fixed time and outputs it. Reference numeral 31 denotes an adding unit that adds the output signal and the input signal of the delay unit 30 and outputs it. Reference numeral 32 denotes a subtracting unit that subtracts the output signal of the delay unit 30 from the input signal and outputs it.

First, the frequency characteristic of the circuit in FIG. 12A will be described. If we let Ta be double the delay time of the delay unit 30, the circuit has the characteristic of damping signals with frequencies of odd multiples of the reciprocal of Ta, as shown in FIG. 13A. With such a simple circuit configuration, the damping characteristic is obtained at a plurality of frequencies. Although completely regular-interval natural frequencies cannot be obtained, a large number of frequencies can be damped by one filter, and thus, the number of filters connected in series can be reduced.

Next, the frequency characteristic of the circuit in FIG. 12B will be described. If we let Tb be the delay time, the circuit has the characteristic of damping signals with DC frequencies of even multiples of the reciprocal of Tb, as shown in FIG. 13B.

Thus, the use of the comb filters shown in FIGS. 12A and 12B can damp a plurality of frequencies. However, this configuration sometimes generates frequencies that cannot be damped because the frequencies to be damped are arranged at regular intervals. Thus, by connecting comb filters corresponding to different frequencies in series, a filter having an irregular-interval damping characteristic can be configured.

Figure 12C:
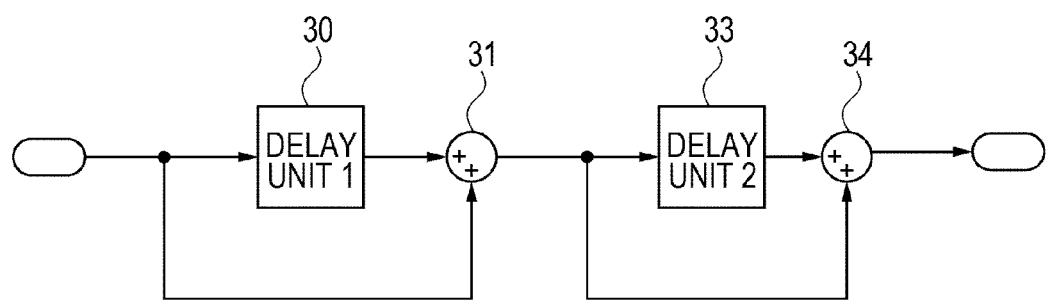
FIG. 12C is a diagram showing a configuration example of a comb filter.
Figure 13C:
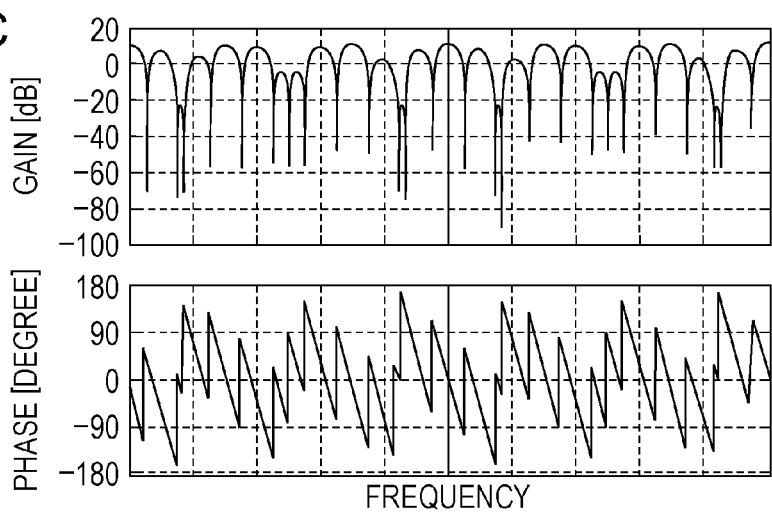
FIG. 13C is a diagram showing the frequency characteristic of the comb filter in FIG. 12C.

FIG. 12C shows a configuration example of a filter having an irregular-interval damping characteristic, and FIG. 13C shows a characteristic example of the filter in FIG. 12C. The filter is configured such that a comb filter 1 configured by the delay unit 30 and the adding unit 31 and a comb filter 2 configured by a delay unit 33 and an adding unit 34 are connected in series.

Although this embodiment has not a unit for detecting the moving speed of the vibration-type actuator, an optical encoder or the like may be used to detect the moving speed or position. A configuration in which the amplitude command A or the frequency command F is changed by predetermined calculation or circuit depending on the difference between a target speed or target position and a detected moving speed or position allows high-accuracy speed control or positional control.

Second Embodiment

Figure 14:
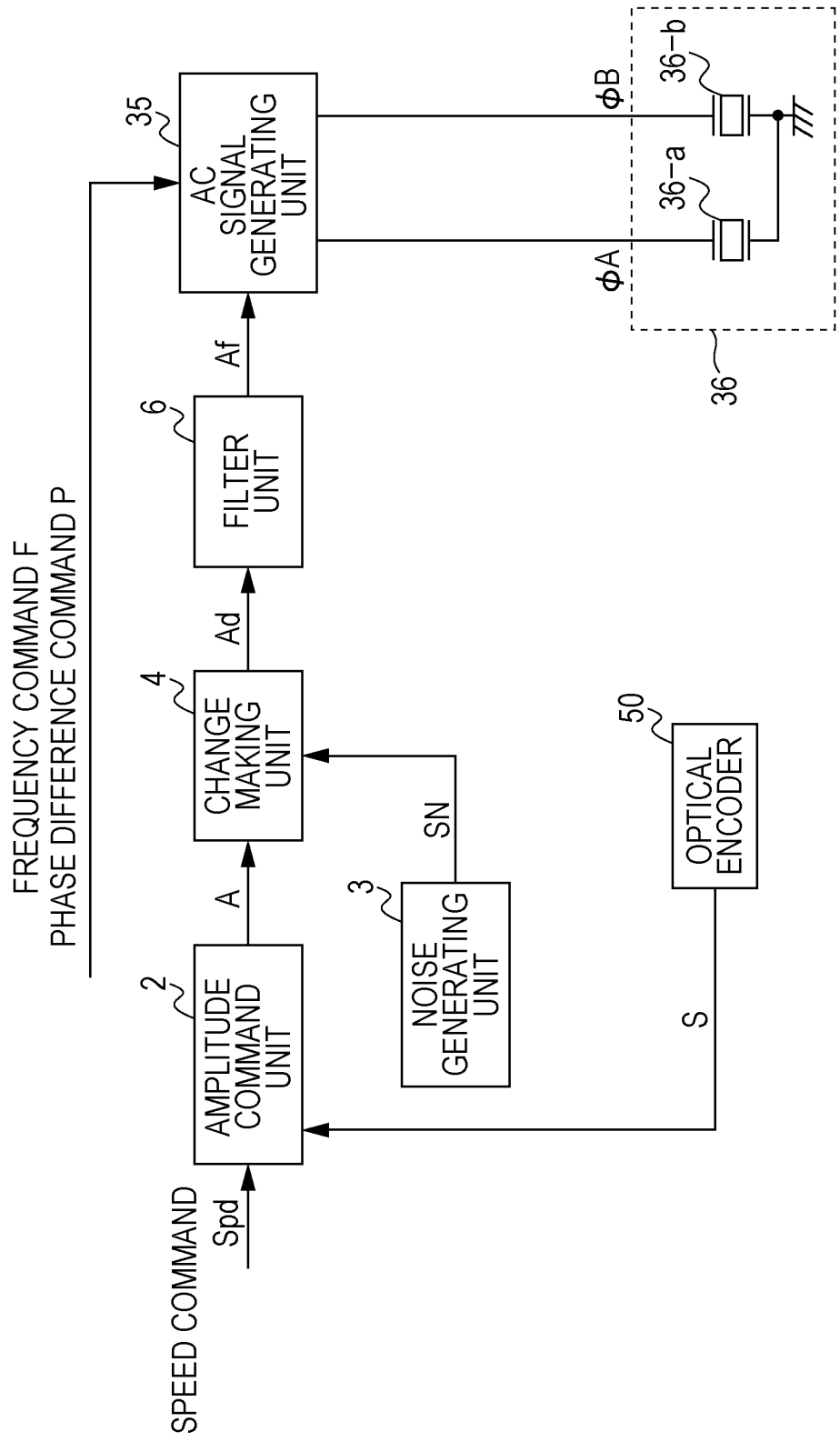
FIG. 14 is a block diagram showing a driving unit according to a second embodiment.

Although the first embodiment has the filter unit 6 at the output side of the AC signal generating unit 5, a second embodiment has the filter unit 6 ahead of the AC signal generating unit 5. FIG. 14 is a block diagram showing a driving unit according to the second embodiment. Since components in FIG. 14 given the same reference numerals as in FIG. 1 have the same functions, descriptions thereof will be simplified.

The amplitude command unit 2 controls the amplitude command A in accordance with a speed command Spd from a command unit (not shown) and a speed signal S from an optical encoder 50, which is a speed detecting unit described later, so that the levels of the speed command Spd and the speed signal S match. In the case where the speed signal S is slower than the level of the speed command Spd, the amplitude command A is increased, and in the case where the speed signal S is faster than the level of the speed command Spd, the amplitude command A is decreased. The filter unit 6 is located ahead of the AC signal generating unit 35. The filter unit 6 damps desired frequency components from noise components contained in the amplitude modulation command Ad and outputs them as an amplitude modulation command Af to the AC signal generating unit 35. The AC signal generating unit 35 generates two-phase AC signals (AC voltage) with an amplitude corresponding to the amplitude modulation command Af, receives a frequency command F and a phase-difference command P from a command unit (not shown), and can set phase difference between the two-phase AC signals. The optical encoder 50 detects the rotational speed of a vibration-type actuator, to be described later, and outputs the speed signal S to the amplitude command unit 2. The two-phase AC signals φA and φB are supplied to the electrodes of electro-mechanical energy conversion elements 36-a and 36-b, respectively.

Figure 15:
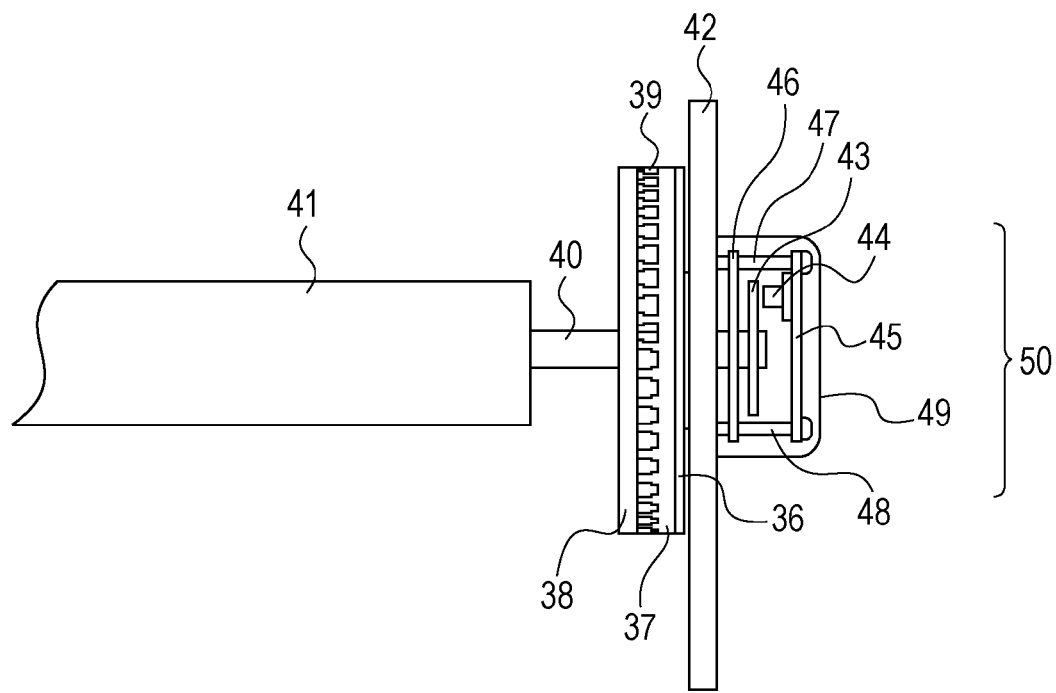
FIG. 15 is a diagram showing a vibration-type actuator according to the second embodiment.

FIG. 15 is a diagram showing a driving mechanism for a photosensitive drum of a printer to which the driving circuit of the vibration-type actuator according to the second embodiment is applied. Reference numeral 36 denotes an electro-mechanical energy conversion element bonded to an elastic body 37, to be described later, and forms a traveling vibration wave on the elastic body 37. The electro-mechanical energy conversion element 36 is formed of a piezoelectric element. Reference numeral 38 denotes a rotor driven by a traveling vibration wave formed on the elastic body 37; 39 denotes a friction member bonded to protruding contact portions of the elastic body 37 between the elastic body 37 and the rotor 38; and 40 denotes a rotation shaft connected to the rotor 38.

Figure 16:
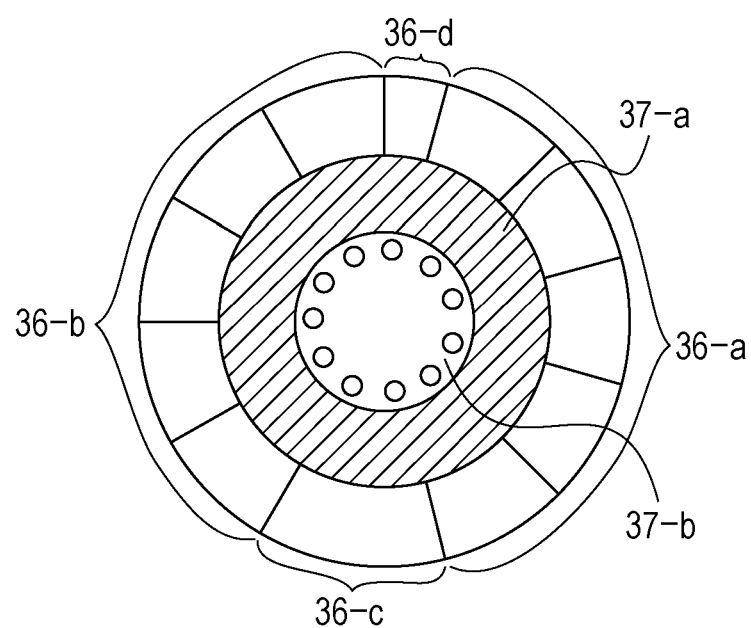
FIG. 16 is a diagram showing the configuration of an elastic body and a piezoelectric element of the vibration-type actuator according to the second embodiment.

FIG. 16 shows the shape of the electrodes provided at the electro-mechanical energy conversion element 36 and the structure of the elastic body 37, as viewed from the electrodes and electro-mechanical energy conversion element 36 side.

Reference numerals 36-a and 36-b in the drawing denote the electrodes of the electro-mechanical energy conversion elements 36-a and 36-b shown in FIG. 14. Reference numerals 36-c and 36-d denote electrodes for connecting to ground potential, which is connected to the elastic body 37 with conductive coating. The elastic body 37 includes a thin circular plate 37-a indicated by hatch lines and a fixing portion 37-b having through-holes at regular intervals for fastening the electro-mechanical energy conversion element 36. In this embodiment, the electro-mechanical energy conversion element 36 is shaped like a ring.

In FIG. 15, reference numeral 41 denotes a photosensitive drum for image formation, which is integrated with the rotation shaft 40; 42 denotes a fixed plate to which the fixing portion 37-b of the elastic body 37 is fixed with screws and which is fixed to the housing of an image forming apparatus (not shown) with a fixing member (not shown); 43 denotes an optical scale for detecting the rotational speed of the rotation shaft 40; 44 denotes a semiconductor laser, which emits near infrared rays onto the optical scale 43; 45 denotes a laser control board on which the semiconductor laser 44 is mounted; 46 denotes a light-receiving board on which is mounted a photo-sensor that detects an optical image formed by light beams that are the near infrared light beams from the semiconductor laser 44 diffracted by the optical scale 43; 47 and 48 denote fixing poles for fixing the laser control board 45 and the light-receiving board 46 to the fixed plate 42; and 49 denotes a light blocking case.

Next, the operation of the driving unit in FIG. 14 will be described. In the first embodiment described above, the vibration-type actuator operates in response to a one-phase AC signal and switches the driving direction by switching the frequency and phase, while in this embodiment, it operates in response to two-phase AC signals and switches the driving direction depending on the phase difference between the two-phase AC signals. Although the fundamental operation is substantially the same as that of the first embodiment, the frequency characteristic of the filter unit 6 differs therefrom as the placement position of the filter unit 6 is changed. Thus, the relationship between the frequency characteristic of the filter unit 6 and the natural frequency of a mechanism that is directly or indirectly connected to the vibration-type actuator will be described.

As shown in FIG. 15, the vibration of the elastic body 37 is transmitted to the optical encoder 50 through the fixed plate 42 and the rotation shaft 40. Thus, the vibration can pose problems in that, for example, a feeding bonding wire (not shown) in the semiconductor laser 44 may resonate to cause poor light emission and the optical scale 43 and the fixing poles 47 and 48 resonate to cause an error in speed detection.

Furthermore, when the amplitudes of the AC signals φA and φB to be supplied to the vibration-type actuator are changed according to the amplitude modulation command Af, the speed of the rotating body, such as the photosensitive drum 41, driven by the vibration-type actuator changes. Therefore, mechanisms that are directly or indirectly connected to the rotation shaft 40 are directly excited to vibrate by frequency component contained in the amplitude modulation command Af. This poses the problem of exciting torsional resonance due to the rotation shaft 40 and the photosensitive drum 41 to deteriorate the quality of an image exposed to light on the photosensitive drum 41.

Figure 17A:
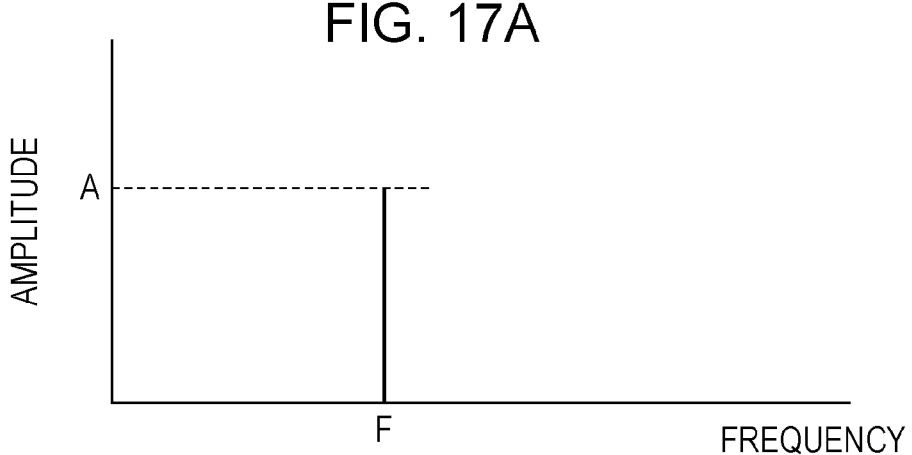
FIG. 17A is a diagram showing an example of the frequency component of an AC signal.
Figure 17B:
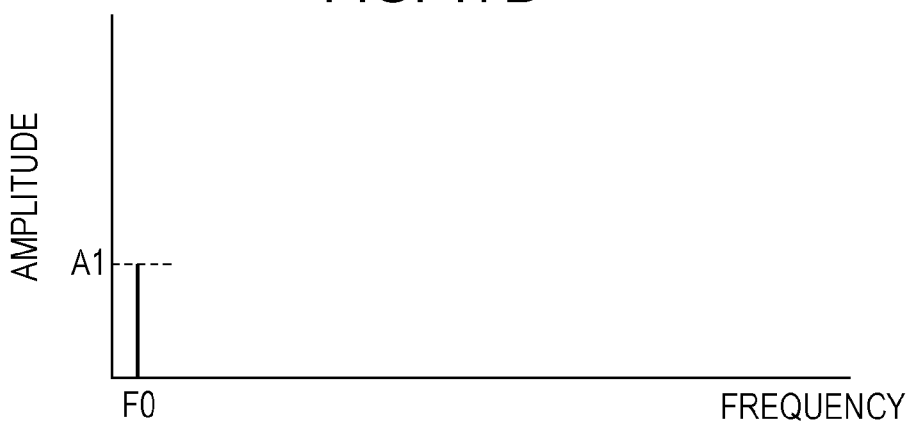
FIG. 17B is a diagram showing an example of the frequency component of an amplitude modulation command.
Figure 17C:
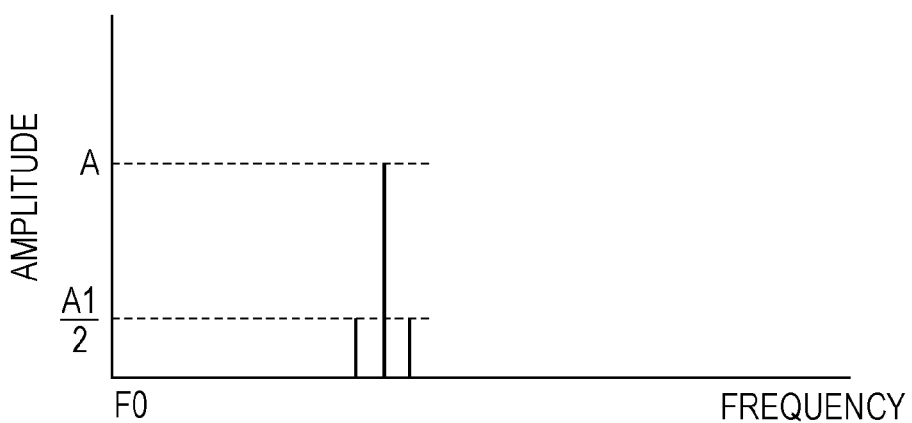
FIG. 17C is a diagram showing an example of the frequency component of the output signal of the AC signal generating unit.

FIG. 17A shows an example of the frequency component of an AC signal generated in response to the frequency command F and the amplitude command A; FIG. 17B shows an example of the frequency component of the amplitude modulation command Af; and FIG. 17C shows an example of the frequency component of the output signal of the AC signal generating unit 35. The amplitude modulation command Af assumes a signal in which a sine wave with a frequency F0 and an amplitude A1 is interposed on the amplitude command A. Amplitude-modulated waves generally have a symmetric frequency characteristic in which the frequency components of the modulated waves appear on both side bands of a center frequency that is a carrier wave. The frequencies on the side bands appear by adding and subtracting the frequency of the amplitude modulation command Af to and from the center frequency. As shown in FIG. 17A, the frequency component before modulation has a component with amplitude A at frequency F. As shown in FIG. 17B, the frequency component of the amplitude modulation command Af has a component with amplitude A1 at frequency F0. As shown in FIG. 17C, the frequency component of the output signal of the AC signal generating unit 35 has the component with amplitude A at frequency F and a component with an amplitude half of the amplitude A1 at frequency F−F0 and frequency F+F0. Accordingly, to prevent a modulated AC signal from containing a frequency that excites the natural frequency of the mechanism, a frequency expressed by the absolute value of the difference between the natural frequency of the mechanism and the center frequency determined by the frequency command F should be eliminated from the amplitude modulation command Ad.

Furthermore, since the mechanism is sometimes directly vibrated by the frequency component of the amplitude modulation command Ad, it is also necessary to eliminate frequencies that excite the natural frequency of the mechanism to be directly vibrated. Accordingly, the filter unit 6 is configured to damp a frequency indicated by the absolute value of the difference between the natural frequency and the frequency command F, in addition to a frequency to be eliminated that excites a natural frequency mode. Although the natural frequency and the frequency that excites the natural frequency are synonymous in the following description, they are not necessarily the same in practice.

Figure 18A:
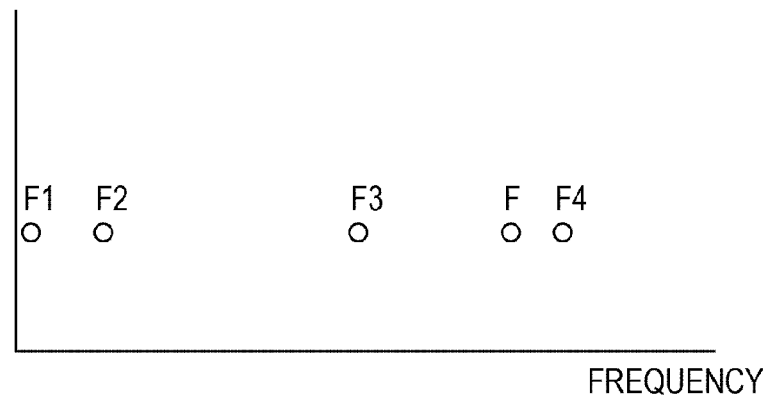
FIG. 18A is a diagram showing the natural frequencies of the individual components of the mechanism according to the second embodiment.
Figure 18B:
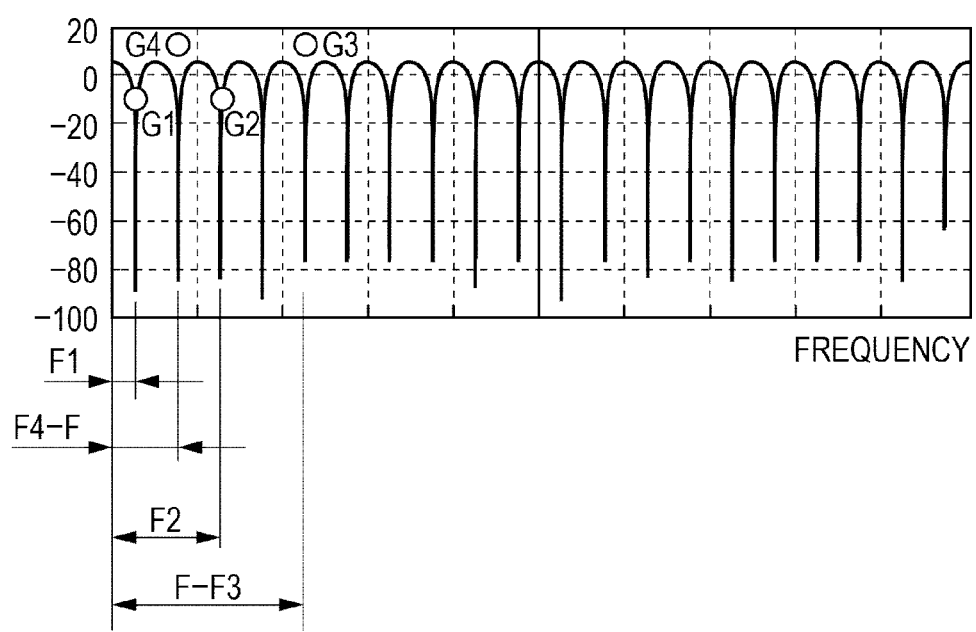
FIG. 18B is a diagram showing the frequency characteristic of a filter unit according to the second embodiment.

FIG. 18A is a diagram showing the natural frequencies of the individual components of the above mechanism, and FIG. 18B shows the frequency characteristic of the filter unit 6. In FIG. 18A, reference sign F denotes the natural frequency of the elastic body 37 in a predetermined vibration mode; F1 denotes the natural frequency of torsional resonance due to the photosensitive drum 41 and the rotation shaft 40; F2 denotes the natural frequency of torsional resonance due to the optical scale 43 and the rotation shaft 40; F3 denotes the natural frequency of the elastic body 37 in another mode other than the main driving mode; and F4 denotes the natural frequency of the bonding wire (not shown) of the semiconductor laser 44.

FIG. 18B shows damped frequencies G1, G2, G3, and G4 corresponding to the frequencies F1, F2, F3, and F4 in FIG. 18A. The natural frequencies F1 and F2 of the torsional vibration generated by the rotational change of the rotation shaft 40 need to be damped or cut directly from the amplitude modulation command Ad. Accordingly, the frequencies G1 and G2 are the same as the frequencies F1 and F2. For the natural frequency F3 of the elastic body 37 and the natural frequency F4 of the bonding wire (not shown), the frequencies G3 and G4 expressed by the absolute values of the differences between the frequency command F and the natural frequencies F3 and F4 correspond, respectively.

Although this embodiment shows an example in which a change is made to the amplitude command A, the filter configuration is the same also in the case where a change is made to the frequency command F or the phase-difference command P to the AC signal generating unit. It is evident from known frequency-modulation and phase-modulation theory that in the case where the frequency or phase difference is modulated, frequency components contained in the modulation command appear on both side bands of the fundamental wave component of the frequency command F as in the amplitude modulation of this embodiment. Therefore, the frequency characteristic of the filter unit 6 is the same in modulation of any of amplitude, frequency, and phase difference. However, strictly speaking, if the frequency or the phase difference is modulated, harmonic components of the modulated frequency are generated, and thus, not only a frequency corresponding to the absolute value of the difference between the natural frequency to be damped and the frequency command F but also a frequency component that is an integral submultiple thereof needs to be damped. However, since a change made is generally small and thus harmonic components are small, it is often sufficient not to modulate a frequency that is an integral submultiple thereof.

In the case where not only the amplitude but also all of the frequency and phase difference are to be changed, it is necessary to connect the filter unit 6 to each of change making units, at the subsequent stage thereof, to damp frequency components corresponding to a natural frequency to be damped before command signals are input to the AC signal generating unit 35.

In this case, a change to be made can be noise SN in which the amplitude, frequency, and phase have little correlation. For example, in the case where the noise generating unit shown in FIG. 8A is used, there is a high possibility that the correlation becomes high even if a signal is generated from the same bit data, and the bit order is changed. To cope with it, generating long-period random numbers using a large-bit-number shift register and carefully selecting a combination of different bits can reduce the influence. Furthermore, using a method of generating M-sequence signals in completely different patterns or using random numbers generated at different timings even in the same pattern can provide random numbers with low correlation. In addition to the method of using M-sequence signals, there are a method of storing random number data in a ROM in advance and using it and a linear congruential method using a known multiplier.

Furthermore, the natural frequency to be damped may be changed because a component to be driven is changed by the operation of the driving mechanism. In this case, the frequency characteristic of the filter unit 6 may be switched to obtain a desired characteristic.

Furthermore, it is necessary to consider the relationship between the effective resolutions of the filter unit 6 and the AC signal generating unit 35. There is no problem if the filter unit 6 and the AC signal generating unit 35 perform analog operation; however, digital operation and discrete arithmetic processing by analog-to-digital conversion or digital-to-analog conversion need careful consideration. This is because if the effective resolution of the input of the AC signal generating unit 35 is lower than the effective resolution of the filter unit 6, an error occurs due to omission of resolutions less than or equal to effective resolution or due to difference in effective resolution.

To ensure the effect of the filter unit 6, it is preferable that rounding be not performed in the operation of the filter unit 6 and the effective resolution of the output signal be equal or an integral multiple of the effective resolution of the AC signal generating unit 35. In other words, if the effective resolution of the input signal of the AC signal generating unit 35 is 1, it is preferable that the effective resolution of the output signal of the filter unit 6 be 1 or greater. This is because, for example, if the resolution of the output signal of the filter unit 6 is 0.5, all changes of 0.5 become noise. Furthermore, it is preferable that the effective resolution of the output signal of the filter unit 6 be an integer greater than or equal to 1. This is because if the effective resolution of the filter unit 6 is 1.5, an error of 0.5 will occur when the AC signal generating unit 35 receives it either as 1 or 2, thus generating new noise.

The foregoing embodiments are typical examples of the vibration-type actuator, that is a linear actuator and a rotating actuator. However, the driving unit of a vibration-type actuator is advantageous not only for such a motor-type vibration-type actuator, provided that voltage amplitude, frequency, phase difference, and so on are to be set at high resolution.

Figure 19:
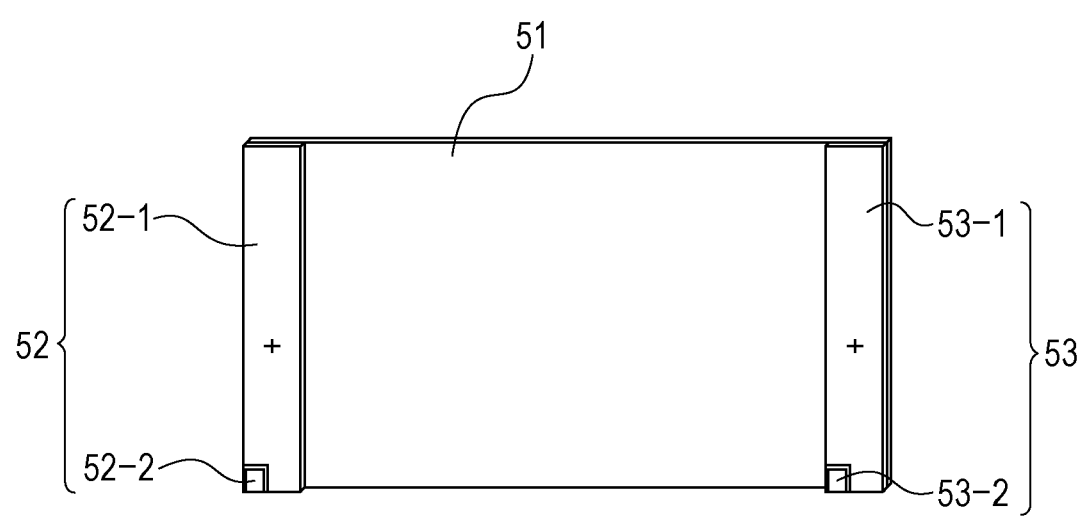
FIG. 19 is a diagram showing and example of a powder-transfer vibration-type actuator.

FIG. 19 shows an optical filter provided on an optical-image receiving surface of a CMOS sensor that is an image-input device of a single-lens reflex camera. This is a powder-transfer vibration-type actuator using an elastic body as an optical filter because dust sticking to the optical filter will deteriorate an image. Reference numeral 51 denotes an optical filter; 52 and 53 denote piezoelectric elements bonded to both ends of the optical filter 51; and 52-1, 52-2, 53-1, and 53-2 are feeding electrodes. The driving circuit can also be applied to such a vibration-type actuator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-064317 filed on Mar. 19, 2010, which is hereby incorporated by reference herein in its entirety.

What is claimed is:

1. A driving unit of a vibration-type actuator, wherein the vibration-type actuator is configured to generate a driving force by exciting a vibrating body, having at least an electro-mechanical energy conversion element, in a predetermined vibration mode by applying an alternating current (AC) signal to the electro-mechanical energy conversion element, the driving unit comprising:
   a command unit configured to output a command signal that directs at least one of a frequency, an amplitude, and a phase difference of an AC signal;
   a change making unit configured to make a change to the command signal and output a changed command signal;
   an AC signal generating unit configured to generate a generated AC signal in which at least one of a frequency, an amplitude, and a phase difference of the generated AC signal is modulated in accordance with the output of the change making unit; and
   a filter unit configured to damp a first frequency component and a second frequency component of output signals of the AC signal generating unit,
   wherein a frequency of vibration in the predetermined vibration mode is between a first frequency of the first frequency component and a second frequency of the second frequency component.

2. The driving unit according to claim 1, wherein the change making unit includes a random-number generating unit and an adding unit.

3. The driving unit according to claim 2, wherein the random-number generating unit is a unit configured to generate an M-sequence signal.

4. The driving unit according to claim 2, wherein the AC signal generating unit includes a frequency divider and a counter.

5. The driving unit according to claim 1, wherein the filter unit is a comb filter that damps a plurality of frequency components.

6. The driving unit according to claim 1, wherein the filter unit is configured such that a plurality of comb filters is connected in series.

7. The driving unit according to claim 1,
   wherein the filter unit is a filter that performs discrete arithmetic processing, and
   wherein an effective resolution of an output signal of the filter unit is greater than or equal to an effective resolution of an input of the AC signal generating unit.

8. The driving unit according to claim 1, wherein the filter unit adds a delayed version of a signal to itself to selectively damp a plurality of frequency components through interference.

9. The driving unit according to claim 1, wherein the driving unit is configured such that an output signal from the filter unit is supplied to the electro-mechanical energy conversion element.

10. The driving unit according to claim 1, wherein the filter unit comprises
    a first filter unit having a function of damping the first frequency component, and
    a second filter unit having a function of damping the second frequency component.

11. The driving unit according to claim 1, wherein the filter unit is between the change making unit and the AC signal generating unit.

12. The driving unit according to claim 1, wherein an absolute value of a difference between the first frequency component and a frequency of vibration in the predetermined vibration mode is a frequency component which is damped by the filter unit.

13. The driving unit according to claim 12, wherein the absolute value of the difference between the first frequency component and the frequency of vibration in the predetermined vibration mode is the same as an absolute value of a difference between the second frequency component and a frequency of vibration in the predetermined vibration mode.

14. A driving unit of a vibration-type actuator, wherein the vibration-type actuator is configured to generate a driving force by exciting a vibrating body, having at least an electro-mechanical energy conversion element, in a predetermined vibration mode by applying an alternating current (AC) signal to the electro-mechanical energy conversion element, the driving unit comprising:
    a command unit configured to output a command signal that directs at least one of a frequency, an amplitude, and a phase difference of an AC signal;
    a change making unit configured to receive the command signal of the command unit, make a change to the received command signal, and output a changed command signal;
    a filter unit configured to receive output signals of the change making unit and dampen the output signals; and
    an AC signal generating unit configured to generate, in accordance with the output of the change making unit, a generated AC signal in which at least one of a frequency, an amplitude, and a phase difference of the generated AC signal is modulated,
    wherein the filter unit is between the change making unit and the AC signal generating unit and is configured such that damping of output signals of the change making unit by the filter unit has a peak at a frequency component.

15. The driving unit according to claim 14, wherein the driving unit is configured such that the generated AC signal output from the AC signal generating unit is supplied to the electro-mechanical energy conversion element.

16. The driving unit according to claim 14, wherein the change making unit includes a random-number generating unit and an adding unit.

17. The driving unit according to claim 16, wherein the random-number generating unit is a unit configured to generate an M-sequence signal.

18. The driving unit according to claim 16, wherein the AC signal generating unit includes a frequency divider and a counter.

19. The driving unit according to claim 14, wherein the filter unit is a comb filter that damps a plurality of frequency components.

20. The driving unit according to claim 14, wherein the filter unit is configured such that a plurality of comb filters is connected in series.

21. The driving unit according to claim 14,
wherein the filter unit is a filter that performs discrete arithmetic processing, and
wherein an effective resolution of an output signal of the filter unit is greater than or equal to an effective resolution of an input of the AC signal generating unit.

22. The driving unit according to claim 14, wherein the filter unit adds a delayed version of a signal to itself to selectively damp a plurality of frequency components through interference.

23. The driving unit according to claim 14, wherein the filter unit comprises
a first filter unit having a function of damping the frequency component, and
a second filter unit having a function of damping another frequency component which is different from the frequency component.

24. The driving unit according to claim 14, wherein the frequency component is an absolute value of a difference between a frequency of vibration in the predetermined vibration mode and a frequency of vibration which is different from the vibration in the predetermined vibration mode.

25. The driving unit according to claim 14, wherein the frequency component corresponds to a natural frequency of at least one of components of the vibration-type actuator or a driving mechanism of the vibration-type actuator.

26. The driving unit according to claim 25, wherein the frequency component has a band such that the frequency component corresponds to a frequency within ±1 kHz around the natural frequency.

27. The driving unit according to claim 25, wherein the frequency component is an absolute value of a difference between the natural frequency and a frequency of vibration in the predetermined vibration mode.

28. The driving unit according to claim 14, wherein damping of output signals of the change making unit by the filter unit reduces an absolute value frequency from an amplitude modulation command, wherein the absolute value frequency is expressed by an absolute value of a difference between a natural frequency of at least one of components of the vibration-type actuator or a driving mechanism of the vibration-type actuator and a center frequency determined by a frequency command.

29. The driving unit according to claim 14, wherein damping of output signals of the change making unit by the filter unit prevents a modulated AC signal from containing a frequency that excites a natural frequency of at least one of components of the vibration-type actuator or a driving mechanism of the vibration-type actuator.

30. A driving unit of a vibration-type actuator, wherein the vibration-type actuator is configured to generate a driving force by exciting a vibrating body, having at least an electro-mechanical energy conversion element, in a predetermined vibration mode by applying an alternating current (AC) signal to the electro-mechanical energy conversion element, the driving unit comprising:
a command unit configured to output a command signal that directs at least one of a frequency, an amplitude, and a phase difference of an AC signal;
a change making unit configured to receive the command signal of the command unit, make a change to the received command signal, and output a changed command signal;
an AC signal generating unit configured to generate, in accordance with the output of the change making unit, a generated AC signal in which at least one of a frequency, an amplitude, and a phase difference of the generated AC signal is modulated; and
a filter unit configured such that damping of output signals of the AC signal generating unit by the filter unit has a peak at a first frequency component,
wherein the first frequency component corresponds to a natural frequency of at least one of components of the vibration-type actuator or a driving mechanism of the vibration-type actuator, and
wherein the AC signal generating unit is between the change making unit and the filter unit.

31. The driving unit according to claim 30, wherein the change making unit includes a random-number generating unit and an adding unit.

32. The driving unit according to claim 31, wherein the random-number generating unit is a unit configured to generate an M-sequence signal.

33. The driving unit according to claim 30, wherein the AC signal generating unit includes a frequency divider and a counter.

34. The driving unit according to claim 30, wherein the filter unit is a comb filter that damps a plurality of frequency components.

35. The driving unit according to claim 30, wherein the filter unit is configured such that a plurality of comb filters is connected in series.

36. The driving unit according to claim 30, wherein the filter unit comprises
a first filter unit having a function of damping the first frequency component, and
a second filter unit having a function of damping a second frequency component,
wherein the second frequency component is different from the first frequency component and a frequency of vibration in the predetermined vibration mode.

37. The driving unit according to claim 30, wherein the first frequency component has a band within ±1 kHz around the natural frequency.

* * * * *